United States Patent
Scheckel et al.

(10) Patent No.: US 7,335,307 B2
(45) Date of Patent: Feb. 26, 2008

(54) METHOD FOR REMOVING CONTAMINANTS FROM WATER USING RUTHENIUM BASED CONTAMINANT SORBENTS AND OXIDIZERS

(75) Inventors: Kirk G. Scheckel, Cincinnati, OH (US); Christopher A. Impellitteri, Cincinnati, OH (US); James A. Ryan, Cincinnati, OH (US)

(73) Assignee: U.S. EPA, Washington, DC (US)

( * ) Notice: Subject to any disclaimer, the term of this patent is extended or adjusted under 35 U.S.C. 154(b) by 7 days.

(21) Appl. No.: 10/698,358

(22) Filed: Nov. 3, 2003

(65) Prior Publication Data

US 2005/0092687 A1    May 5, 2005

(51) Int. Cl.
*B01D 15/00* (2006.01)

(52) U.S. Cl. ............... 210/679; 210/681; 210/683; 210/911

(58) Field of Classification Search ............... 210/679, 210/681, 683, 911
See application file for complete search history.

(56) References Cited

U.S. PATENT DOCUMENTS

| | | | | |
|---|---|---|---|---|
| 5,911,882 | A * | 6/1999 | Benjamin et al. ........... | 210/679 |
| 5,985,790 | A * | 11/1999 | Moskovitz et al. ......... | 502/415 |
| 6,602,421 | B2 * | 8/2003 | Smith ......................... | 210/662 |
| 6,863,825 | B2 * | 3/2005 | Witham et al. ............. | 210/665 |
| 2002/0121482 | A1 * | 9/2002 | Ciampi et al. .............. | 210/716 |

* cited by examiner

*Primary Examiner*—Chester T. Barry
(74) *Attorney, Agent, or Firm*—Browdy and Neimark, P.L.L.C.

(57) ABSTRACT

Ruthenium compounds, either alone or in combination with other remediating compounds, can be used to oxidize, remove and sequester contaminants in water and soil or sediments.

25 Claims, 13 Drawing Sheets

METHOD FOR REMOVING CONTAMINANTS FROM WATER USING RUTHENIUM BASED CONTAMINANT SORBENTS AND OXIDIZERS

FIELD OF THE INVENTION

The present invention relates to the use of ruthenium compounds as sorbents and oxidizers of contaminants in liquids and solids such as water, soil, and solid waste.

BACKGROUND OF THE INVENTION

Heavy metal contamination in water, soil, and sediment is a global problem. In particular, awareness of the problems created by arsenic contamination has increased in recent years because of reports from Asia describing immense health problems due to arsenic in drinking water (Karim, 2000; Berg et al., 2001). Changes in U.S. regulations for arsenic maximum contaminant level (MCL) values in drinking water, from 50 down to 10 micrograms/liter, have also increased interest and research concerning arsenic in the environment.

Oxides of metals and certain non-metals are known to be useful for removing contaminants from a gas or liquid stream by absorbent mechanisms. For example, activated alumina is considered to be an economical absorbent for treating water to remove a variety of pollutants, gases, and some liquids. Activated carbons have been used to decompose hydrogen peroxide, hydrazines, or other water pollutants such as organic acids, quaternary ammonium slats, and sulfur-containing compounds, as described by Abe et al. in U.S. Pat. No. 5,242,879.

Metal oxide phases play an important role in governing the sorption and desorption mechanisms of metals in water, soils, and sediments. Many researchers have examined the efficiency of lead sorption on manganese, iron, titanium, aluminum and silicon oxide surfaces. Most of these studies concluded that adsorption of lead onto the oxide surface was the sorption mechanism. However, some studies observed induced coprecipitation of lead with the oxide phase. Further, lead sorption capacity has been extensively studied on a variety of sorbents such as activated carbon, agricultural byproducts, cation exchange resins, and aquatic exoskeletons. To be an effective remediation sorbent for lead removal from solution, a cost analysis for the amount of lead sorbed per unit cost of sorbent must be determined. Commonly, most of the examples listed above rarely achieve more than a few weight percent lead per unit weight of sorbent.

Speciation of the adsorbed lead complex can be best accomplished by X-ray absorption spectroscopy studies. Bargar et al., *Geochim. Cosmochim. Acta.* 1997, 61:2639-2652, used X-ray absorption fine structure spectorsocpy (XAFS) to investigate the speciation of lead complexes sorbed to hematite and goethite. They determined that lead was adsorbed via a mononuclear bidentate mechanism to the iron octahedral of the hematite and goethite surfaces regardless of pH, sorption density, and initial lead concentration. The highest surface loading Bargar et al. achieved was for lead sorption ([Pb]0=9.6. mM) on hematite at pH 7, resulting in a Pb:hematite ratio of 10% by weight. Percent weight values presented in the present application were calculated form experimental parameters and data presented in the cited literature.

Aluminum oxides have also been examined in similar fashion. Strawn et al., *Environ. Sci. Tehchnol.* 1998 32: 2596-2601, observed the formation of inner-sphere bidentate bonding of lead to gamma-alumina at pH 6.5 with a resulting sorption capacity of appropriately 2.6%.

Bargar et al., *Geochim. Cosmochim. Acta* 1997, 61: 2617-2637, studied lead reactions with alpha-alumina (with some gamma-alumina impurity), using XAFS to determine lead binding as mono- and polynuclear bidentate complexes on the edges of the aluminum octahedral. At a solution pH of about 7, yielding the highest surface coverage, Bargar et al. found a lead sorption maximum of 1.6^ on an alpha-alumina, resulting in the formation of Pb—Pb dimers.

Results from an XAFS investigation on lead sorption onto amorphous silica by Elzinga and Sparks, *Environ. Sci. Technol* 2002, 36: 4352-4357, showed mononuclear inner-sphere lead sorption complexes when the pH was less than 4.5. Between 4.5 and pH 5.6, they observed formation of surface-attached mononuclear and covalent polynuclear lead species, possibly Pb-Pb dimers, and these dimmers were the dominant sorption product about pH 6. At the higher pH values, where Pb—Pb dimers were the predicted sorption complex, the lead capacity on the amorphous silica surface reached 6%. A detailed equilibrium and kinetic study coupled with XAFS analysis for lead sorption again shows the formation of mononuclear bidentate sorption complex for lead on birnessite (pH 3.7) and manganite (pH 6.7) Matocha et al. (*Environ. Sci. Technol.* 2001, 35:2967-2972) determined surface loadings of lead at roughly 28% and 1.3% for birnessite and manganite, respectively.

While most spectroscopic studies of lead sorption to metal oxide surfaces show mononuclear and polynuclear bidentate sorption mechanisms, the type of sorbent significantly influences the retention of lead during subsequent desorption analyses. For lead sorbed to gamma-alumina at pH 6.5, desorption using a replenishment method coupled with a cation exchange resin with the sorption background electrolyte at pH 6.5 showed that the sorbed lead was 98% reversible. However, lead removal via the background electrolyte from birnessite resulted in only a fraction of a percent desorbed with respect to the total lead sorbed. Numerous studies have shown the effect of sorbent type on the retention of lead on natural materials, with results varying form 0 to 100% lead retention.

Prior research on remediating arsenic-contaminated water sources has focused on removing arsenic by adsorption and/or co-precipitation processes. Of the sorbents studied, iron-based media have received the most attention. Recent studies on removing arsenic have focused on mechanisms of sorption (Lackovic et al., 2000; Farrell et al., 2001), kinetics (Su et al., 2002; Melitas et al., 2002), and competition from anions (Su et al., 2001).

The mechanism for removal of arsenic by zerovalent iron media is dominated by sorption reactions between arsenic and oxidation products formed from zerovalent iron. A large volume of literature exists concerning the effects of iron oxides on the behavior of arsenic, including sorption of arsenic on amorphous iron oxide, (Pierce et al., 1980; Pierce et al., 1982), goethite (Sun et al., 1998; Manning et al., 1998; O'Reilly et al., 2001), lepidocrocite (Randall et al., 2001), ferrihydrite (Grafe et al., 2002; Jain et al., 1999), and hematite (Redman et la., 2002).

Manganese oxides have also been used in studies concerned with arsenic sorption (Manning et al., 2002). The ability of manganese oxides to oxidize As(III) has been well documented (Tournassat et al., 2002; Moore et al., 1990; Driehaus et al., 1995; Scott et al., 1995) and has important implications for the fate of arsenic in the environment and water.

The oxidation reaction from As(III) to As(V) by birnessite follows second-order kinetics with respect to As(III), and half-lives have been reported ranging from 0.15 (Scott et al., 1995) to 203 hours (Oscarson et al., 1983). Scott and Morgan found no sorption of the oxidation product because of the low point of zero change of birnessite of 2.7 (Scott et al., 1995). Tournassat et al. 2002 reported the presence of a mixed manganese-arsenic precipitate following oxidation of As(III) to As(V) by birnessite and thus illustrated a mechanism explaining the disappearance of As(III) from solution.

Arsenic sorption on aluminum oxides has been studied (Anderson et al., 1975; Arai et al., 2001; Halter et al., 2001). Sorption of As(V) onto aluminum oxides is similar in magnitude to arsenic sorption on iron oxides. Halter and Pfeiffer concluded that As(V) sorption by corundum resulted in more stable complexes (octahedral coordination) than as (V)-iron oxide complexes, especially at pH values greater than 5.5 (Halter et la., 2001). Arai et al., 2001, examined As(III) and As(V) sorption on gamma-alumina. They found that As(V) was strongly bound by inner-sphere complexation, while weaker outer-sphere complexes dominated the absorption of As(III).

Iron, aluminum, manganese, and copper based media have all been extensively used for removing contaminants from liquids and solids. The disadvantages associated with these elements are that the rate of uptake for iron, aluminum and manganese based media are slow and greatly affected by the pH of the system treated. Oxidation of reduced forms or arsenic is achieved in an efficient manner only by manganese compounds. While phosphorus has been used to precipitate cations in various environments, phosphorus may not be effective in removing anions.

SUMMARY OF THE INVENTION

It is an object of the present invention to overcome the aforesaid deficiencies in the prior art.

It is another object of the present invention to provide sorbents and oxidizers of contaminants in water.

It is still another object of the present invention to provide sorbents and oxidizers of contaminants in soil, sediment, solid water, and the like.

Ruthenium compounds have been found to sorb and oxidize contaminants in water, wastewater, soil, sediment, and solid waste. Ruthenium is commonly found in the +3 or +4 oxidation state in natural environments. As such, it is a highly effective electron scavenger.

Most sorbent and oxidizing materials can sorb either cations or anions efficiently, but not both, because of surface charge effects. Ruthenium compounds, on the other hand, are highly effective in sorbing lead, arsenic, and other cations at the same pH values as anion absorption. In the case of lead, solid concentrations approached 100% for sorbing lead over a wide pH range. For arsenic, As (III) is oxidized to As(V) by ruthenium compounds in less than five seconds. Sorption of arsenic can result in bound arsenic concentrations as high as 25% by weight.

BRIEF DESCRIPTION OF THE DRAWINGS

FIG. 1a contains the results for initial arsenic as As(III). FIG. 1b contains the results for As(V).

FIG. 2a shows data for the entire time period of the experiments. FIG. 2b shows the initial five minutes.

FIGS. 9q contains results for initial As as As(III). FIG. 9b contains results for As(V). The black line represent s the fit of the NLR model, and the gray line represents the Freundlich model fit. Standard deviation as measured by 3 replicates for the 1000 mg/L initial concentration is within the size of the markers.

FIG. 10a shows data for the entire time period of the experiments. FIG. 10b shows data for the initial five minutes. The Experiments were performed with 2.5 grams $RuO2 \cdot xH2O$ in 100 mL of a 250 mg As (III) or (V) solution. Thus, the percent arsenic sorbed may be roughly interpreted by dividing y-axis values by 100.

DETAILED DESCRIPTION OF THE INVENTION

Figure 1A:
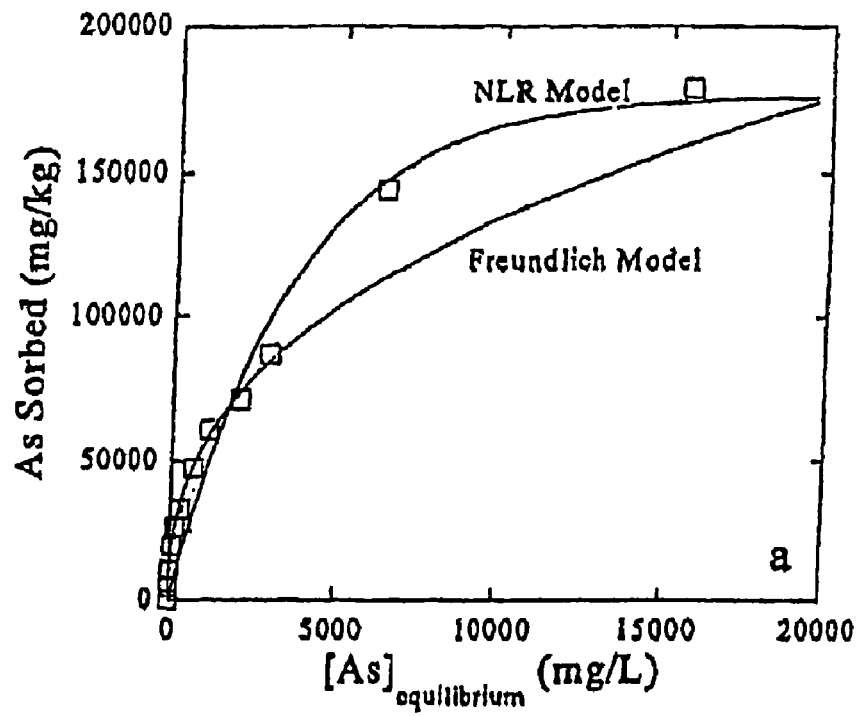
FIGS. 1a and 1b are constant solid: solution isotherms for initial arsenic species at pH 7.

Ruthenium compounds can be used for removing and oxidizing inorganic and organic compounds as well as elements in water, wastewater (domestic and industrial), solid, sediments, and solid waste. The ruthenium compounds can be used in large commercial scale or small private applications, e.g., point of use treatment. The ruthenium compounds can be used alone or in combination with other absorption/precipitation treatment systems or in combined treatment systems.

Ruthenium compounds that can be used for soil or water remediation according to the present invention include:

1. $RuO_2 \cdot xH_2O$ where x denotes the degree of hydration (typically x=0 to 3)
2. Mixed precipitates
   Ru—Fe oxyhydroxides,—$(Fe_x,Ru_{1-x})OOH$
   Ru—Fe hydroxides,—$(Fe_x,Ru_{1-x})(OH)_n$
   Ru—Fe oxides,—$(Fe_x,Ru_{1-x})O_n$
   Ru—Mn oxyhydroxides,—$(Mn_x, Ru_{1-x})OOH$
   Ru—Mn hydroxides,—$(Mn_x,Ru_{1-x})(OH)_n$
   Ru—Mn oxides,—$(Mn_x,Ru_{1-x})O_n$
   Ru—Al oxyhydroxides,—$(Al_x,Ru_{1-x})OOH$
   Ru—Al hydroxides,—$(Al_x,Ru_{1-x})(OH)_n$
   Ru—Al oxides,—$(Al_x,Ru_{1-x})O_n$
3. Coatings on or complexes with
   Sand/silica
   Zeolite structures
   Nylon
   Polystyrene
   Cellulose The process of the present invention can be used to remove a large variety of substances from contaminated water or soil. Generally, positively charged and negatively charged elements in ionic form and/or charged compounds of the elements are removed by the process of the present invention by the ruthenium compounds that can be used are listed above.

Specifically, potential contaminants for treatment include:
1. Cationic-charged forms and/or salts and complexes (e.g. nitrate salts, sulfate salts etc.) of cations including (but not limited to) Ca, Cu, Cd, Ni, Pb, Zn, Cr, Co, Hg, U, Mn, Mg etc.
2. Anions- and anionic species including perchlorate ($ClO_4^-$), chloride ($Cl^-$), bromide ($Br^-$), arsenicals (arsenate and arsenite), phosphate, nitrate, sulfate and associated salts and compounds of these anions (e.g. sodium arsenate $NaH_2AsO_4$, potassium bromide KBr etc.)
3. Organic (carbon based) contaminants including charged and/or polar pesticides, fuels, pharmaceuticals, endocrine disruptors, or disinfection by-products.
4. Biological contaminants with charged surfaces, including bacteria, oocytes, spores, etc.

Ruthenium (Ru, atomic number 44) belongs to the group VIII elements and is considered one of the platinum group elements. The most common oxides of ruthenium are $RuO_4$ and $RuO_2$. $RuO_4$ was found to be effective in the oxidation of dioxins (Ayres et al., 1983). $RuO_2$, the relatively more stable species, has been used as a catalyst in chlorine production (Yang et al., 1999). The hydrous form, $RuO_2 \cdot xH_2O$, has been used in the electro oxidation of methanol in fuel cells (McKeown et al., 1999)). The increasing presence of water disrupts the three-dimensional (rutile type) structure of $RuO_2 \cdot xH_2O$, and the structure tends to become more chainlike (McKeown et al., 1999). Atomic scale research on $RuO_2$ and its catalytic reactivity with carbon monoxide shows that a large amount of surface ruthenium is present as highly active sites for the coordination of CO. The $RuO_2$ catalyzes the conversion of CO to $CO_2$, which is evolved with heating, leaving holes in the $RuO_2$ structure resulting from oxygen vacancies. Researchers suggest that these vacancies are filled by atmospheric oxygen (Over et al., 2000).

Ruthenium has an extremely high sorption capacity for both inorganic and organic compounds as well as elements. This makes it possible to use a very small amount of a ruthenium compound for field purification of water, soil/sediment amendments for sequestration of inorganic and organic chemical compounds or elements, Use of ruthenium compounds as sorbents/oxidizers makes it possible to meet wastewater-treatment standards and soil/sediment standards in a cost-effective manner. The ruthenium compounds can be used to treat contaminated soils, sediments, and solid waste materials, including but not limited to mine wastes, hazardous wastes, municipal wastes, agricultural wastes, industrial wastes, to reduce the soluble, bioavailable, and phytoavailable inorganic and organic compounds as well as elements.

Ruthenium is rare, making up only 0.0001 mg/kg in the earth's crust, and it is generally found as a metal along with other platinum metals, nickel, and/or copper deposits (Greenwood et al., 1997). Its chief industrial uses are in electronics (e.g., resistors, hard drive media), catalysis and charge storage. The annual worldwide production of ruthenium is on the order of tons.

Ruthenium belongs to the same elemental group as iron, Group VIIIA, and was expected to behave similarly to iron in sorbing cations. However, ruthenium has a larger ionic radius compared with iron, and it was found that this larger radius allowed more efficient sorption and oxidation of larger elements such as lead and anionic compounds such as arsenate and arsenite.

Ruthenium compounds sorb a wide range of inorganic compounds, organic compounds, and elements across a broad range of pH values, namely, 2-10. This sorption is extremely rapid. The ability of ruthenium compounds to oxidize reduced forms or inorganic and organic compounds as well as elements is followed by rapid sorption of the oxidation product. The extremely high capacity for sequestration of inorganic and organic compounds as well as elements makes ruthenium compounds particularly well suited for soil or water remediation.

Other metal containing compounds may also oxidize arsenic, but the rate of oxidation is much slower than with ruthenium compounds, the capacity to sorb arsenic is much less, and the effective pH range is much less. The high sorption capacity of the ruthenium makes it possible to use small amounts of these compounds.

Ruthenium compounds are particularly effective in sorbing lead and other cations at the same pH values as for anion sorption. In the case of lead, solid concentrations approached 100% for the sorption of lead across a wide pH range.

Extreme and Preferred Ranges of Conditions pH: Extreme: or >10 Preferred: 4-8
Temperature: Extreme: <0° C. of >100° C. Preferred: 5° C. to 50° C.
Pressure: Extreme: Unknown Preferred: 1 atm.
Ionic Strength: Extreme>>1 M Preferred: 0 to 0.1M Sorption of Lead on a Ruthenium Compound Sorption of lead was investigated on a ruthenium compound using kinetic macroscopic and microscopic techniques. This study was designed to elucidate the sorption mechanism of lead onto a high-affinity ruthenium compounds with time at pH 6 using batch methods and X-ray absorption fine structure (XAFS) and X-ray diffraction (XRD) spectroscopies. For the spectroscopic studies, lead sorbed ruthenium samples were analyzed in situ via XAFS to determine bond distances, coordination numbers, and identity of nearest neighbors and as a freeze-dried powder for XRD to detect changes in the crystal structure of the ruthenium compound.

The result of the kinetic bath experiments showed that lead sorption is extremely rapid, with greater than 90% removal from a 0.4M Pb(NO3)2 (8288 ppm) solution within one hour. The ruthenium phase possessed a sorption capacity of 800,000 mg lead per kg of solid ruthenium compound, which far exceeds the sorption capacity of typically employed iron, manganese, and aluminum oxides.

XAFS data indicate that the lead is sorbed as a tightly bound inner-sphere complex. XRD studies showed that the high coverage of lead diminishes the characteristic peaks for the ruthenium compound through the sorption mechanism on the solid surface and may indicate incorporation into the ruthenium structure.

Batch Sorption Experiments

All chemicals used were ACS reagent grade (Fisher Sci., Fair Lawn, N.J.) unless otherwise noted. Stock solutions of $NaAsO_2$ and $Na_2HAsO_4 \cdot H_2O$ (Sigma, St. Louis, Mo.) of 10,000 mg/L were made in a background electrolyte (BG) of 0.01 M $NaNO_3$ for each pH level experiment. Target pH levels for the experiments were 4, 5, 6, 7, and 8±0.5. A 0.2 g sample of $RuO_2 \cdot xH_2O$ (Assay Ru 54-58%, Alfa Aesar, Ward Hill, Mass.) was placed in a round-bottom Teflon centrifuge tube and the appropriate volume of BG and stock solution were added for a final total volume of 10 mL. Surface area of the $RuO_2 \cdot xH_2O$ was assessed by 5-point Brunauer-Emmet-Teller (BET) $N_2$ sorption isotherms on 3 replicates using a Gemini 2375 surface area analyzer (Micromeritics, Norcross, Ga.). Initial concentrations of As(III) or As(V) were 0, 100, 250, 500, 750, 1000, 1750, 2500, 3750, and 5000 mg/L. Due to the high sorption capacity of $RuO_2 \cdot xH_2O$, it was necessary to perform additional experiments at 10,000 and 20,000 mg/L using 20,000 mg/L stock solutions. Three replicates were included for the 1000 mg/L initial As concentration for each pH. The mixtures were placed on an end-over-end shaker at 20 rpm and the pH was measured (ThermoOrion Model 350 with perpHect pH combination probe, Beverly, MA) 2-3 times daily in open air. The pH was adjusted to the target pH by addition of $HNO_3$ or NaOH. After the pH stabilized (defined as no change within ±0.5 pH units for 24 hours), the mixture was tumbled for an additional 24 hours. Generally, the pH of the samples stabilized within 3 days, thus the total equilibration time was approximately 4 days. The samples were then filtered through a 0.1 μm cellulose filter (Osmonics, Minnetonka, Minn.). Preliminary work indicated that there was no retention of As by these filters. Initially, filtered solutions from the pH 4 and 5 experiments were speciated for As(III) and As(V) by dilution and separation on anion exchange cartridges (QMA Sep-Pak, Waters Corp. Milford, Mass.). This particular anion exchange cartridge was subjected to tests in previous research (33) and tested under the conditions presented here in preliminary work (please see Figures A and B in the supporting information for details). The solutions were acidified to <pH 2 (after speciation if applicable) and analyzed for As (detection limit 11 μg/L) by inductively coupled argon plasma spectrometry (ICAP) (IRIS Intrepid, ThermoElemental, Franklin, Mass.). After correcting for dilution due to acid/base additions, constant solid:solution isotherms were constructed (34) and modeled by non-linear regression (NLR-asymptote through origin) using the statistical package in the computer program R (35), and the Freundlich model (please see supporting information for details). The models were used to evaluate differences due to pH and initial species present by comparison of parameters within the models. The NLR model yields plateau or y-max values (c) which estimate maximum sorption values. The Freundlich models were used to estimate distribution coefficients ($K_f$) as a function of pH and initial As species present.

Kinetic Experiments

Kinetic experiments were performed in an automatic titration system (DL77, Mettler-Toledo, Columbus, Ohio) in pH stat mode (pH 7). A 2.5 g sample of $RuO_2 \cdot xH_2O$ was added to a polyethylene sample cup along with 97.5 mL BG, and 2.5 mL of the appropriate 10,000 mg/L stock solution (initial As(III) or As(V) concentration =250 mg/L). The mixture was constantly stirred at 1000 rpm by propeller. Samples were taken before addition of the As (time 0) and at times ranging from 5 seconds to 56 hours. The solution aliquots taken were immediately speciated by anion exchange resin, acidified, and analyzed by ICAP for As and Ru (detection limit 15 pg/L). The experiment with As(III) as the initial species was duplicated. Solution concentrations were plotted as a function of time and analyzed by integrated rate law equations.

X-ray Absorption Near-Edge Spectroscopy (XANES).

All samples were prepared at 22° C. (±2). A 2.0 g sample of $RuO_2 \cdot xH_2O$ was equilibrated (at pH=7) with 10 mL solutions of 500 mg/L As (V) or As(III) for periods of one month, two weeks, one week, and 24-hours. The samples were equilibrated until the pH remained at 7 for 24 hours (3 days total). For the 24-hour samples (only oxic samples were examined for this time period) the required base was estimated from the other samples and was added along with the As and the mixture was equilibrated for 24-hours. The oxic samples were centrifuged and washed 3 times in BG, vacuum filtered through a 0.1 pm cellulose filter, covered, and left to dry in a dessicator. The anoxic samples were purged with $N_2$ and kept in a zero head space container for the specified time period. Immediately prior to analysis, the anoxic samples were vacuum filtered in an $N_2$ purged glove box, washed with $N_2$ purged BG and the resulting paste transferred to Teflon sample holders for analysis. Pure $NaAsO_2$ and $NaHAsO_4 \cdot 7H_2O$ (Reagent grade, Fisher Scientific, Fairlawn, N.J.) was mixed with KBr in different proportions for a total As concentration of 10,000 mg/kg. The different quantities (0-100%, 25-75%, 50-50% etc.) allowed semi-quantitative analysis of the samples for percent ranges of As(III) and As(V) in the samples. This semi-quantitative approach was modeled after work by Schulze et al. on Mn oxidation states (36). Arsenic K-edge spectra (11,867 eV) were collected at beamline 5-BM (Dow-Northwestern-duPont Collaborative Access Team) at the Advanced Photon Source at Argonne National Laboratory, Argonne, Ill. XANES spectra were collected in both transmission and fluorescence mode with a solid state detector. The electron storage ring operated at 7 GeV with the horizontal entrance slit set at 6 mm and the vertical at 2.3 mm. Scans ranged from 11,767 eV to 12,245 eV. Data were analyzed by WinXAS version 1.3 (37). Individual spectra were background corrected using a 2-polynomial fit, three spectra per sample were averaged, and the first derivative calculated for each averaged spectra. The results for the samples were compared with those from the fabricated reference materials for assessment of solid state speciation of As.

Results and Discussion

Batch Sorption Experiments

BET surface area measurements averaged 58.0±7 $m^2/g$ (n=3). The plateau values (or y-max values) for the batch sorption experiments and calculated Freundlich coefficients for the experiments are given in Table 1 and representative data are shown in FIG. 1 for the pH 7 experiment. $RuO_2 \cdot xH_2O$ has a high capacity for removing As from solution. At pH 7, $RuO_2 \cdot xH_2O$ has sorption maxima at approximately 70,000 mg/kg when As(V) is the initial species present and 176,000 mg/kg when the initial species is As(III). These values correspond to surface loadings of 16.1 μmol/$m^2$ (for As(V)) and 40.5 μmol/$m^2$ (for As(III)). Table 2 compares these surface loadings with results from studies in the literature. Results in table 2 must be interpreted and compared with caution as experimental conditions (e.g. pH, synthesis methodologies, etc.) vary. The sorption capacity of $RuO_2 \cdot xH_2O$ for As is generally higher than the capacities of other oxides.

The plateau values indicate that when As(III) is present as the initial species, total As sorption is increased. From the Freundlich model data, a general decrease in $K_f$ occurs as pH increases which corresponds to a decreasing capacity for As removal from solution as pH increases. For the first experiments (at pH 4 and 5) where solutions were speciated, no trace of As(III) was present. This was investigated further in the kinetics experiments.

Kinetics

Results for the speciation of As indicated that 98-100% of the As initially present as As(III) was oxidized in less than 5 seconds (see Figure C in supporting information). This is in contrast to studies employing Mn-oxides (synthetic birnessite) where most to all of the As(III) was oxidized in 60 minutes (20) to 80 minutes (21). FIG. 2 shows sorption of total As as a function of time. FIG. 2b expands the initial stages of the kinetics experiment. For initial species as As(III), both replicates showed an initial spike of sorption, followed by a slight release of As back into solution, followed by a gradual uptake of As. It is speculated that this may correspond to a catalytic reaction where As(III) is oxidized and released back into solution, but this will require further experimentation for confirmation. There was no Ru detected in any of the solution aliquots taken for the kinetic experiments.

The data were processed by linearized versions of rate laws (see Figures D and E in supporting information for details and results). The sorption reaction data for both initial species conform very well to $2^{nd}$ order kinetics and thus the rate is dependent on initial concentration. The rate constants, k, for the different initial species present were: $k_{AS(V)}$=0.02930 mol$^{-1}$ s$^{-1}$, replicate 1 $k_{AS(III)}$=0.00801 mol$^{-1}$ s$^{-1}$, and replicate 2 $k_{AS(III)}$=0.00438 mol$^{-1}$ s$^{-1}$. These values correspond to half-lives, $\tau^{1/2}$, for these specific initial conditions of: $\tau^{1/2}_{As(V)}$=3.2 h, replicate 1 $\tau^{1/2}_{As(III)}$=11.6 h, and replicate 2 $\tau^{1/2}_{s(III)}$=21.14 h. Though discrepancy exists in the replicates (possibly due to slight sampling time differences in the early stages of the experiments), the k for As(V) is an order of magnitude greater than the k for As(III). These data, combined with results from the batch-sorption experiments, suggest that the early rate (within $\tau^{1/2}$) of sorption for As(V) as the initial species is greater, but that the ultimate capacity for As sorption is greater when As(III) is present as the initial species.

XANES Results

Figure 3:
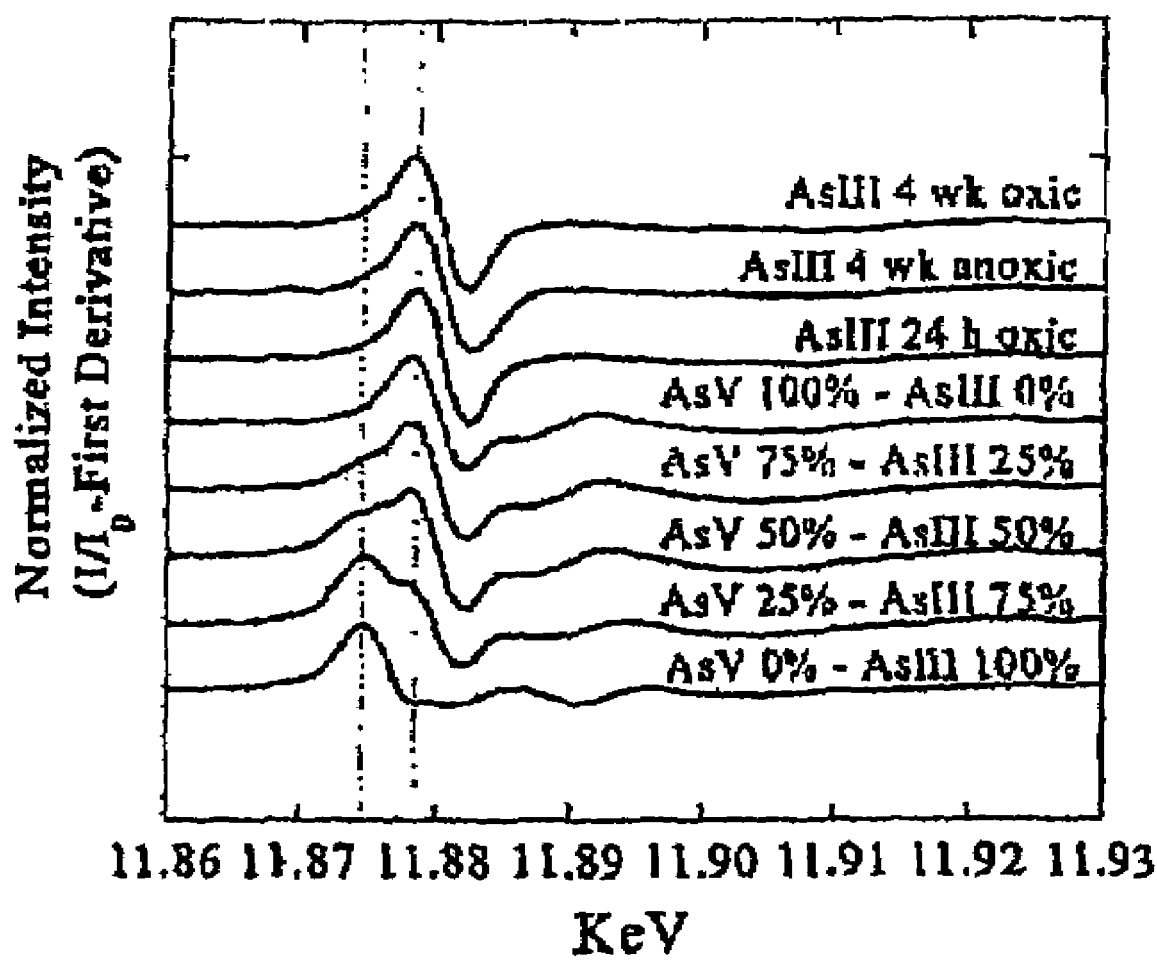
FIG. 3 shows the XANES results for the arsenic reference standards and representative samples.

FIG. 3 shows the results for the fabricated reference materials and selected samples. There was no evidence of the presence of As(III) on the solid phase for any of the combinations examined. For the longest time period in anoxic conditions, 4 weeks, there was no evidence of As(III) so, irrespective of the initial species, no reduction of As occurred in this time frame. Future experiments should include long term stability studies. Data from the shortest exposure of As(III) to $RuO_2.xH_2O$ conclusively illustrated the association of As(V) alone with the solid state.

A possible explanation for the increase in sorption when As(III) is present as the initial phase is structural change. Over et al. (32) clearly showed voids in the $RuO_2$ structure following the evolution of $CO_2$ which was the oxidation product of CO. If a similar phenomenon occurs with the oxidation of As(III) to As(V), the addition of reactive binding sites due to voids from vacated oxygen atoms may be responsible for the higher ultimate capacity for binding the recently oxidized As(V). This hypothesis would need testing possibly by transmission electron microscopy (EM), tunneling EM and/or scanning EM.

This study shows that $RuO_2.xH_2O$ acts as a powerful oxidizer of reduced As and that the compound has a high affinity for As(V). Researchers at the USEPA's National Risk Management Research Laboratory are also examining $RuO_2.xH_2O$ sorption of Pb with encouraging results. It is speculated that $RuO_2.xH_2O$ would have a significant effect on organic contaminants (e.g. dioxins) also and with further research, $RuO_2.xH_2O$ may make current remediation processes more effective in the oxidation, removal, and degradation of a wide variety of contaminants.

Although decades of research have focused on determining the kinetics and mechanisms of trace metal reactions at mineral surfaces, accurate kinetic measurements have been problematic and difficult to quantify. The underlying reason for this is methodology. For example, most adsorption/ desorption reaction reactions on mineral surfaces are extremely rapid (t1/2<20 seconds). Determining reaction rates for such systems is difficult if nor impossible, since the reactions are often complete as soon as the adsorptive and adsorbent are mixed. Furthermore, traditional techniques such as batch and flow methods are often transport-controlled or diffusion-controlled and determine apparent rate laws. Because of these difficulties, rates and mechanisms for reactions at mineral-water interfaces may vary by orders of magnitude.

Kinetics techniques are available that allow one to determine reaction rates for these rapid reactions. Examples of these techniques include temperature-jump, pressure-jump, and electric field pulse. These techniques are termed relaxation methods, which is based on the theory from which the method was developed. Relaxation methods rely on the fact that chemical equilibria depend on factors such as temperature and pressure. A sudden change in pressure or temperature perturbs the chemical equilibrium, and the reaction time (relaxation time) is measured using some physical measurement (e.g., conductivity) as it returns or relaxes back to equilibrium. The applied perturbation is very small, so measurements are made close to the final equilibrium throughout the relaxation time. Because of this small perturbation rate, all rate expressions are reduced to first order, regardless of the reaction order or molecularity (Bernasconi, 1986). This makes data analysis relatively simple and straightforward. Another important feature of chemical relaxation is that both the forward (K1) and reverse (k-1) rate constants are measured in one experiment. A ratio of k1/k-1 provides one with the equilibrium constant for the reaction. This information is extremely important, since many trace elements and oxyanions (e.g., arsenate) have a very high affinity for oxide surfaces, and often these values cannot be determined using conventional techniques.

These techniques, primarily pressure-jump, have been used to determine the kinetics and mechanisms of trace element adsorption/desorption on mineral surfaces. However, the data generated has been limited to only a few trace metal cations. Moreover, in many cases the data obtained form these experiments have been improperly analyzed (Pohlmeirer, 1999). Reasons for the lack of kinetic data generated by relaxation techniques include the cost of the equipment, the lack of commercially available units, and the difficulty in operation and proper data analysis.

Understanding the basic reactions that occur at mineral-water interfaces is critical for assessing the bioavailability of heavy metal cations and oxyanions, such as lead and arsenic.

Recently, a pressure-jump relaxation spectrometer has become available for obtaining valuable kinetic information for trace element adsorption/desorption reactions on ruthenium oxide surfaces. This information is critical in assessing the potential use of ruthenium oxide as a sorbent of environmental contaminants, such as heavy metals.

Materials and Methods

Surface Area

The specific surface area was determined by a five-point $N_2$ Bruanuer-Emmett-Teller (BET) gas adsorption isotherm using a Micrometrics 2010 surface area analyzer. In addtion a t-plot isotherm was conducted to determine the presence microporosity and calculate micropore area. The Ru-oxide was degassed for three days at 70° C. to prevent changes in the crystal structure.

Surface Potential

Surface potential measurements were taken from the adsorption experiments using a Malvern Zetasizer 3000 HS. Samples were removed from the pH-stat with an electronic pipet and stored in $N_2$-purged 50 ml centrifuge tubes prior to analysis. The pH of each sample was measured prior to the Zeta potential measurements to account for any drift due to absorption of atmospheric carbon dioxide. The sample cell was purged with 100 ml of ultra pure water between each sample.

Adsorption Experiments

All adsorption experiments were conducted using pH-stat at a suspension density of 0.50 g $l^{-1}$ Ru-oxide in a background electrolyte of 0.01 M $NaNO_3$. Adsorption experiments were run at 3 pH values for both lead (3,5, and 8) and arsenate (4,6,8). Arsenate and lead were analyzed using Inductively coupled plasma atomic emission spectroscopy (ICP-AES).

Pressure-jump Relaxation Kinetics

Pressure-jump experiments were conducted using a Dia-Log pressure jump relaxation spectrometer. Samples from the adsorption experiments were used in the pressure-jump experiments. A sample was extracted using an electronic pipet and half of that sample was filtered through a 0.20 μM filter. The Ru-oxide suspension was added to the sample electrode cell and the filtered supernatant was added to the reference electrode cell. The cells, sealed with a thin Teflon membrane, were inserted into the pressure autoclave, which comprised one part of the whole pressure-jump apparatus, the other part being a system for conductivity detection.

The entire pressure autoclave was encased in a water jacket to control temperature. The autclove was sealed with a thin strip of brass foil milled to burst once the pressure reached 13.5 Mpa. Pressure was appled to the autoclave by forcing water into the chamber with a hand-operated mechanical pump. The pressure purturbation was achieved by increasing the pressure until the brass foil burst and the pressure instantaneously dropped to ambient conditions.

The relaxation information was monitored by the conductivity detection system, comprised of a wheatstone bridge, a digitizer, an oscilloscope, and a personal computer. The sample and the reference electrode cells were linked to and comprised two arms of the wheatstone bridge. The other two arms were made up of variable resistors and capacitors that were adjusted to balance the bridge using an oscilloscope. The bridge was balanced at ambient conditions and became unbalanced upon pressurization. Thus, after the brass, foil ruptured, a piezoelectric capacitor triggered collection of the relaxation event, which was recorded as a voltage change associated with the bridge returning to its original balanced state. The information digitized and relayed to a PC, where the relaxation curve was immediately displayed on a computer monitor. At least 10 relaxations were overlayed for each sample.

Results

Surface Area

The surface area of the Ru-oxide as determined by a five point BET isotherm was 37.86 $m^2$ $g^{-1}$ (see results at the end of this report). However, upon inspection of the C-value one notices that it is negative (−469). A negative C value is indicative of micropores and hence the BET external surface area calculated should be questioned. A t-plot was conducted in addition to the BET isotherm to determine the micropore area. Results indicated that the external surface area is 15.64 $m^2$ $g^{-1}$ while the micropore area is 22.19 $m^2$ $g^{-1}$. Adsorption of trace metal contaminants in micropores should reduce their potential to desorb and this reduced potential to desorb should increase over time (residence time effect).

Surface Potential

| pH | Surface Potential Ru-oxide Alone (mV) | Surface Potential 0.10 mM Pb (mV) | Surface Potential 0.10 mM As (mV) |
|---|---|---|---|
| 3 | 27 | 4.7 | |
| 4 | 2.9 | | −21.1 |
| 5 | −20.9 | −13.8 | |
| 6 | −33 | | −37.3 |
| 7 | −46.4 | | |
| 8 | −47.7 | −3.71 | −46.4 |
| 9 | −49 | | |
| 10 | −48 | | |

The point of Zero Charge (PZC) was determined from the extrapolation of surface potential measurements for the Ru-oxide surface alone (≈4.1). The surface potential is increased in the presence of Pb and decreased in the presence of arsenate suggesting that both of these trace elements are specifically adsorbed to the Ru-oxide surface. There was little change in the surface potential after arsenate adsorption at pH 8 which is most likely due to the small amount adsorbed to the Ru-oxide surface at this pH (See adsorption results). It is unclear why there was a decrease in the surface potential upon lead adsorption at pH 3 and further studies are necessary to determine if this is real instrument error.

Adsorption Experiments

Figure 11:
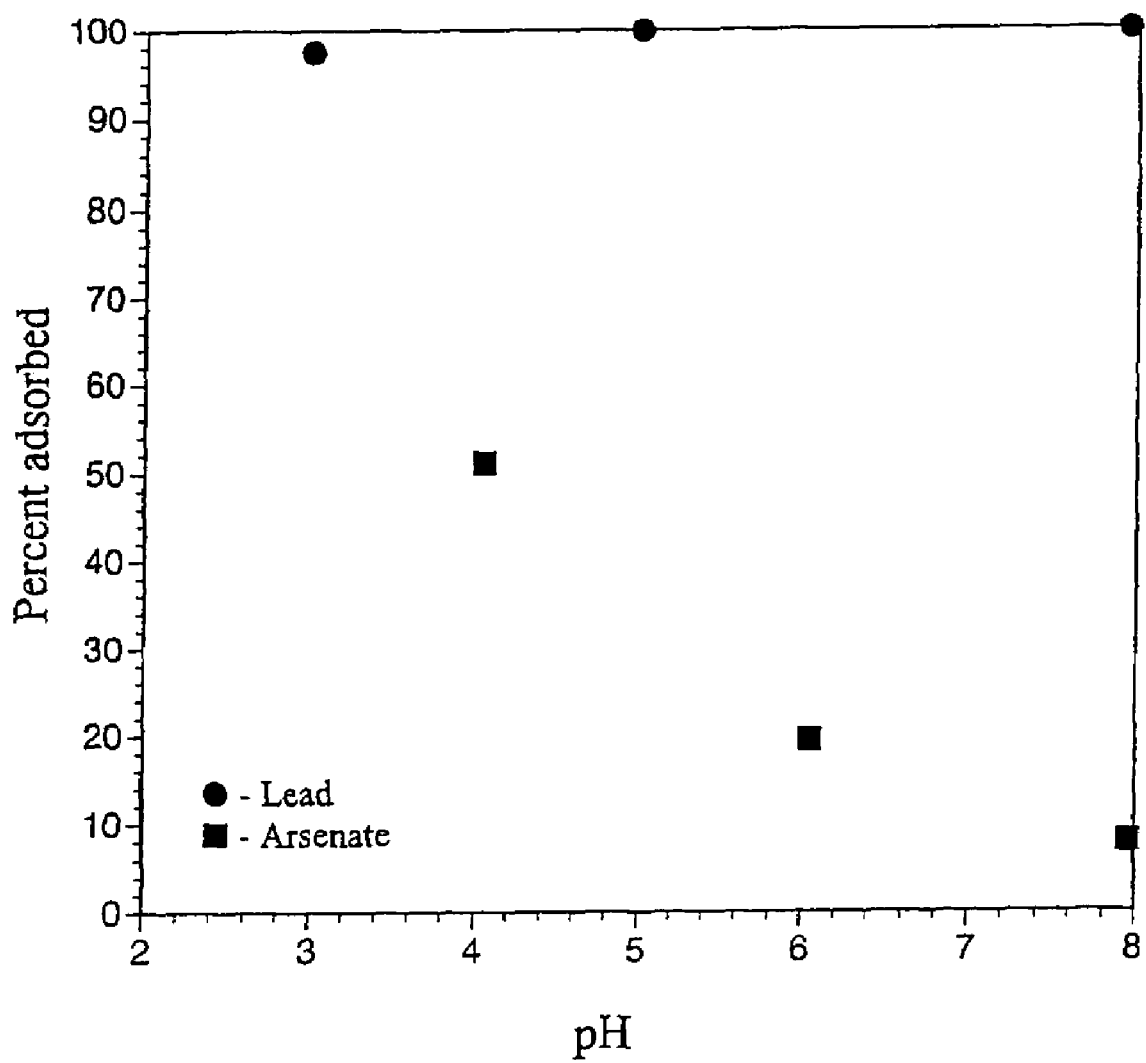
FIG. 11 shows the percent of arsenate and lead adsorbed to ruthenium oxide as a function of pH.

The percent of arsenate and lead adsorbed to the ruthenium oxide as a function of pH are shown in FIG. 11. Lead has an extremely high affinity for the Ru-oxide surface as nearly 100% of the added lead (0.10 mM) is adsorbed over the entire pH range (3-8). In contrast arsenate has less affinity for the Ru-oxide surface with about 50% of the added arsenate (0.13 mM) adsorbed at pH 4 and only 8% at pH 8.

Pressure Jump Relaxation Kinetics

Figure 12:
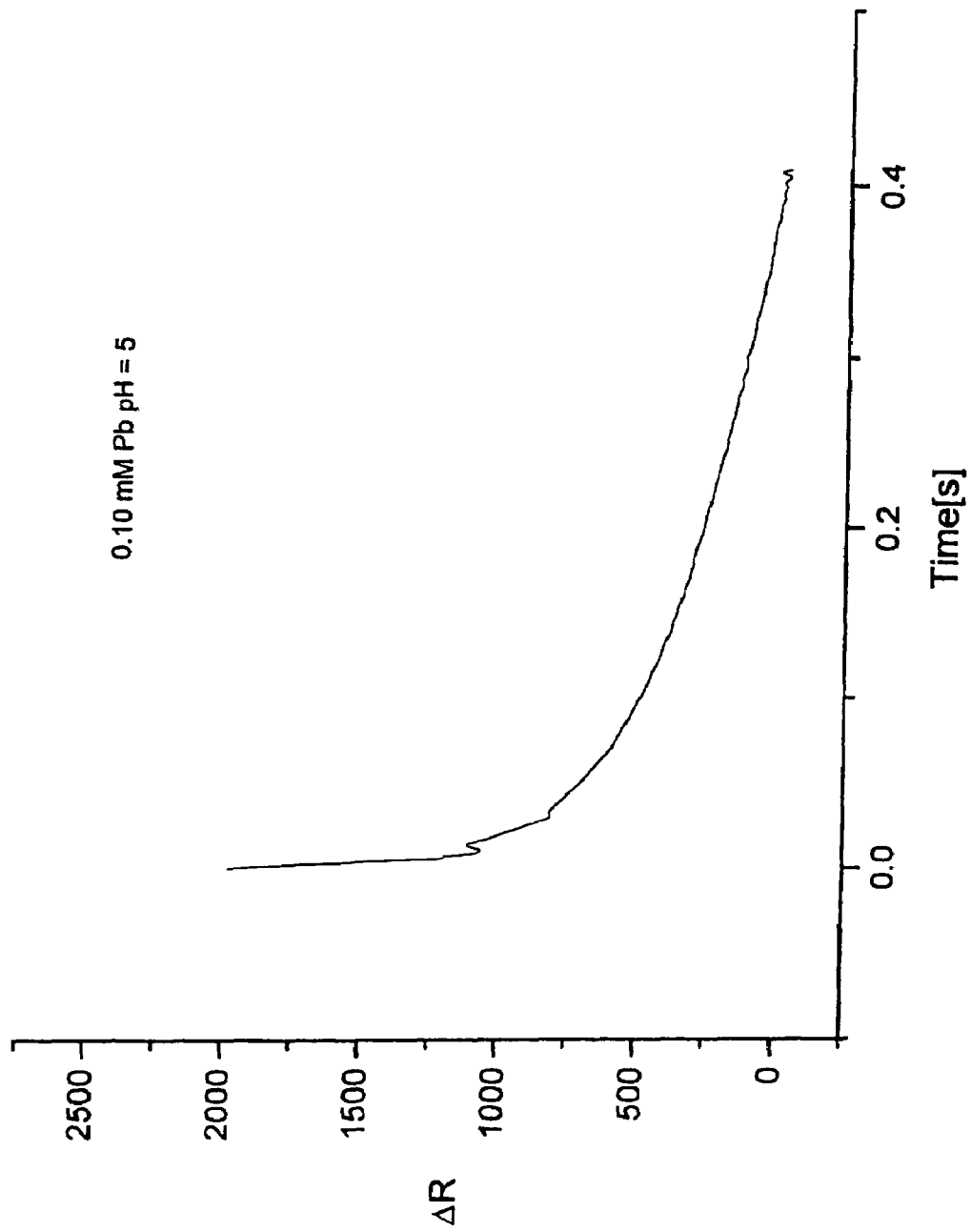
FIG. 12 shows typical relaxations for arsenate at pH 6.
Figure 13:
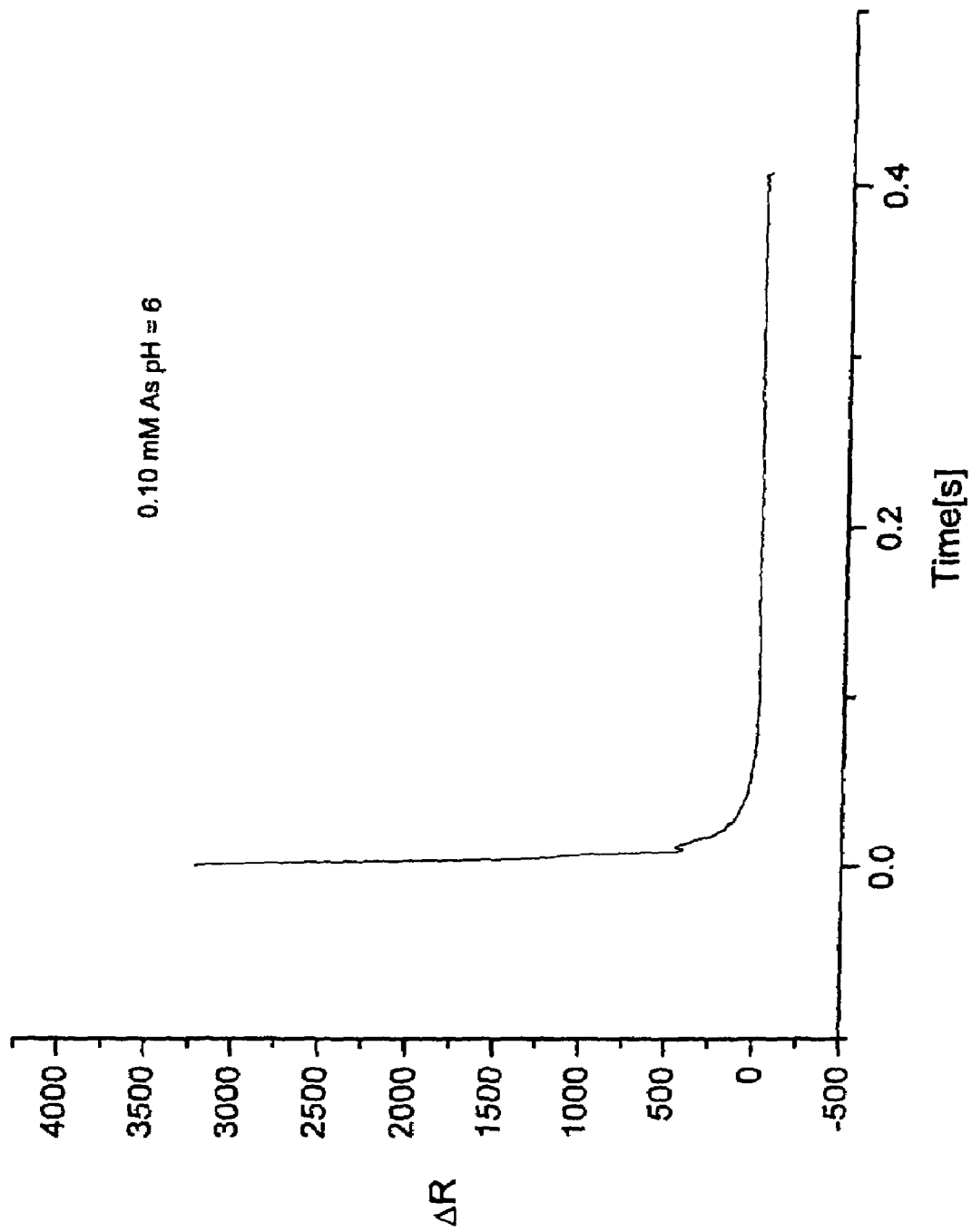
FIG. 13 shows typical relaxations for lead at pH 5.

Typical relaxations are shown in FIGS. 12 and 13 for arsenate (pH 6) and lead (pH 5), respectively. Similar relaxations were obtained for the other pH values. Although data analysis was not completed on these relaxations curves, visual inspection indicates that arsenate adsorption is much faster than Pb. A thorough evaluation of the adsorption/desorption kinetics requires pressure-jump experiments at numerous pH values and surface loadings and several temperatures.

The greater As sorption capacity of $RuO_2.xH_2O$ relative to other oxides alone may not justify the use of this relatively rare material in treatment strategies. However, when other factors are considered (i.e. oxidizing capacity, ability to sorb cations and anions in a wide pH range, etc.), it can be concluded that further studies on $RuO_2.xH_2O$ are warranted. Though the cost of raw Ru is relatively high (as of this writing, approximately $60.00/31 g, 31 g/troy ounce), the addition of small amounts of $RuO_2.xH_2O$ to water treatment media and soil/sediment reactive media may be highly cost-beneficial.

TABLE 1

Values for Parameters as a Function of Initial As Species and pH for ht Asymptote through Origin Nonlinear Regression (NLR) Model and the Freundlich Model[a]

| initial | | NLR parameters | | Freundlich parameters | |
|---|---|---|---|---|---|
| as species | ph | c | d | $K_1$ | 1/n |
| V | 4 | 52 145 | −2.83 | 12 589 | 0.20 |
| V | 5 | 103 300 | −6.89 | 11 481 | 0.25 |
| V | 6 | 61 735 | −5.43 | 8 128 | 0.24 |
| V | 7 | 66 653 | −.85 | 5 370 | 0.29 |

TABLE 1-continued

Values for Parameters as a Function of Initial As Species and pH for ht Asymptote through Origin Nonlinear Regression (NLR) Model and the Freundlich Model[a]

| initial | | NLR parameters | | Freundlich parameters | |
|---|---|---|---|---|---|
| as species | ph | c | d | $K_1$ | 1/n |
| V | 8 | 19 559 | −5.98 | 1 412 | 0.34 |
| III | 4 | 211 700 | −8.06 | 16 218 | 0.26 |
| III | 5 | 205 200 | −7.72 | 10 715 | 0.30 |
| III | 6 | 224 800 | −8.09 | 7 244 | 0.35 |
| III | 7 | 175 900 | −8.15 | 4 073 | 0.38 |
| III | 8 | 193 900 | −8.85 | 128 | 0.76 |

[a]The NLR model takes the form $q = c[1 - \exp(-\exp(d)x_i)]$ where q= $[As]_{absorbed}$ (mg/kg), c = y max (plateau value), and d = log(d) where d describes the rate of change of uptake curve. The Freundlich model is of the form $q = K_1 C^{1/n}$ where $K_1$ = distribution coefficient and n is a correct factor.

Figure 1B:
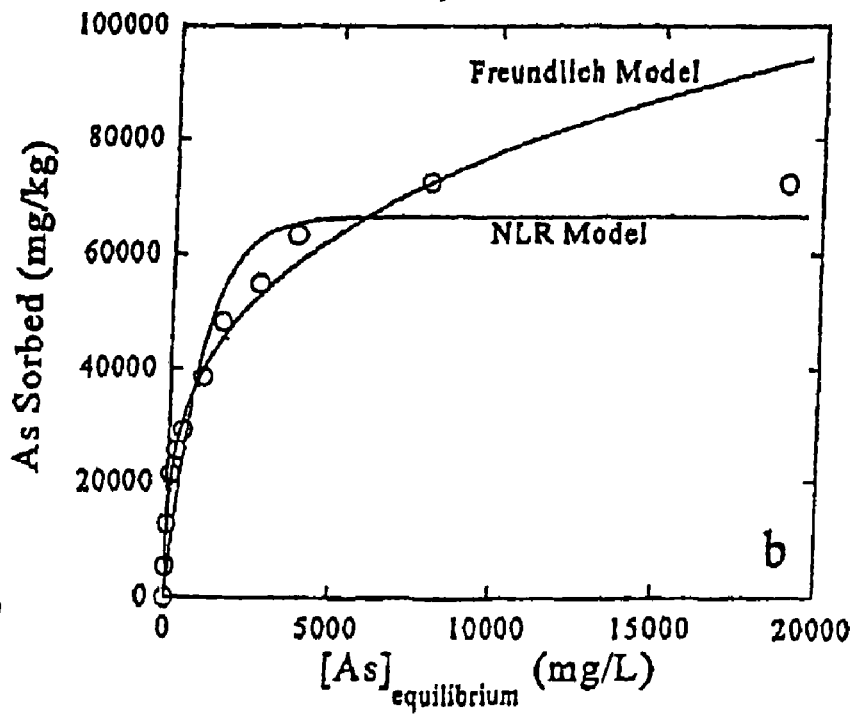

FIGS. 1a and 1b show constant solid:solution isotherms for both initial arsenic species at pH 7. FIG. 1a contains the results for initial arsenic as As(III). FIG. 1b contains the results for As(V). The black line in each figure represents the fit of the NLR model, and the gray line represents the Freundlich model fit. Standard deviation as measured by three replications for the 1000 mg/L initial concentration is within the size of the markers.

As can be seen from FIG. 1, $RuO_2.xH_2O$ has a high capacity for removing arsenic from solution. At pH 7, $RuO_2.xH_2O$ has sorption maximum at approximately 70,000 mg/kg when As(V) is the initial specious, and 176,000 mg/kg when As (III) is the initial species. These values correspond to surface loadings of 16.1 micromol/m2 for As(V), and 40.5 micromol/m2 for As(III). These values correspond to surface loadings of 16. 1 micromol/m2 for As(V) and 40.5 micromol/m2 for As(III). Table 2 compares these surface loadings with results from studies in the literature. The results in Table 2 must be interpreted and compared with caution, as experimental conditions (e.g., pH, synthesis methodologies, etc. vary). The sorption capacity of $RuO_2.xH_2O$ for arsenic is generally higher than the capacities of other oxides.

TABLE 2

Surface Loading Rates for As (V) on a Variety of Minerals[a]

| compound/formula | experimental pH | surface loading ($\mu mol/m^2$) | source |
|---|---|---|---|
| ruthenium oxide/$RuO_2 \cdot xH_2O$ (As(III) initial species) | 7.0 | 40.50 | this study |
| ruthenium oxide/$RuO_2 \cdot xH_2O$ (As(V) initial species) | 7.0 | 16.10 | this study |
| birnessite/$MnO_2$ | 6.5 | 3.78-7.91[b] | 17 |
| aluminum oxide/$\gamma$-$Al_2O_3$ | 5.5 | 1.40[c] | 24 |
| activated aluminal/$Al_2O_3 \cdot xH_2O$ | 6.5 | 0.12[c] | 38 |
| kaolinite/$Al_2Si_2O_5(OH)_4$ | 5.0 | 0.18[c] | 39 |
| montmorillonite/$(Al,Mg)_8(Si_4O_{10})_4(OH)_8 \cdot 12H_2O$ | 5.0 | 0.09[c] | 39 |
| ferrihydrite/$\delta'$-FeOOH | 3.0 | 3.20[c] | 14 |
| ferrihydrite/$\delta'$-FeOOH | 4.6 | 12.40[c] | 40 |
| goethite/$\alpha$-FeOOH | 3.0 | 2.40[c] | 41 |
| goethite/$\alpha$-FeOOH | 6.0 | 2.30[c] | 12 |

[a]The pH data are given because the sorption reactions are pH dependent.
[b]Values are results from two different experiments. See reference for details.
[c]Values calculated from data in reference.

The plateau values indicate that, when As(III) is present as the initial species, total arsenic absorption is increased. From the Freundlich model data, a general decrease in Kf occurs as pH increases, which corresponds to a decreasing capacity for arsenic removal from solution as pH increases. For the first experiments, at pH 4 and 5, where solutions were speciated, no trace of As(III) was present. This was investigated further in the kinetics experiments.

Kinetic experiments

Kinetic experiments were performed in an automatic titration system (DL77, Mettler-Toledo, Columbus, Ohio in pH stat mode, i.e., pH 7. A 2.5 gram sample of $RuO_2.xH_2O$ was added to a polyethylene sample cup along with 97.4 ml of background electrolyte describe above, and 2.5 ml of the appropriate 10,000 mg/L stock solution (initial As(III) or As(V) concentration=250 mg/L). The mixture was continuously stirred at 1000 rpm by propeller.

Samples were taken before addition of the arsenic (time 0) and times ranging from five seconds to 56 hours. The solution aliquots taken were immediately speciated by anion-exchange resin, acidified, and analyzed by ICAP for arsenic and ruthenium (detection limits 15 microg/L). The experiment with As(III) as the initial species was duplicated. Solution concentrations were plotted as a function of time and analyzed by integrated rate law equations.

The results for speciation of arsenic indicated that 90-100% of the arsenic initially present as As(III) was oxidized in les than five seconds. This is in contrast to studies using manganese oxides (synthetic birnessite), wherein most to all of the As(III) was oxidized in 60 (Driehaus et al., 1995) to 80 minutes (Scott et al., 1995).

Figure 2A:
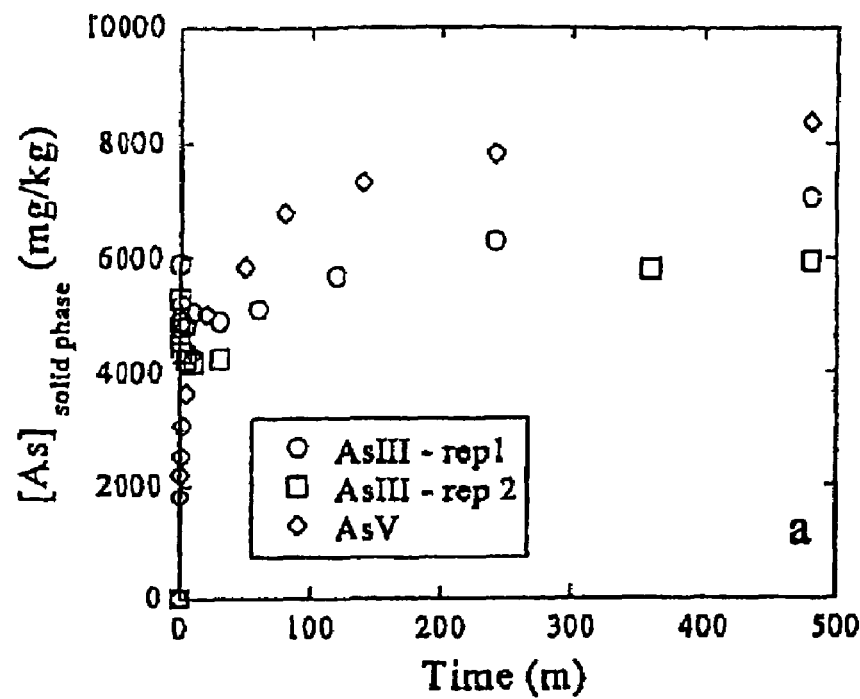
FIGS. 2a and 2b show kinetic data for total arsenic uptake at pH 7 from solutions with either As(III) or As(V) as the initial species.
Figure 2B:
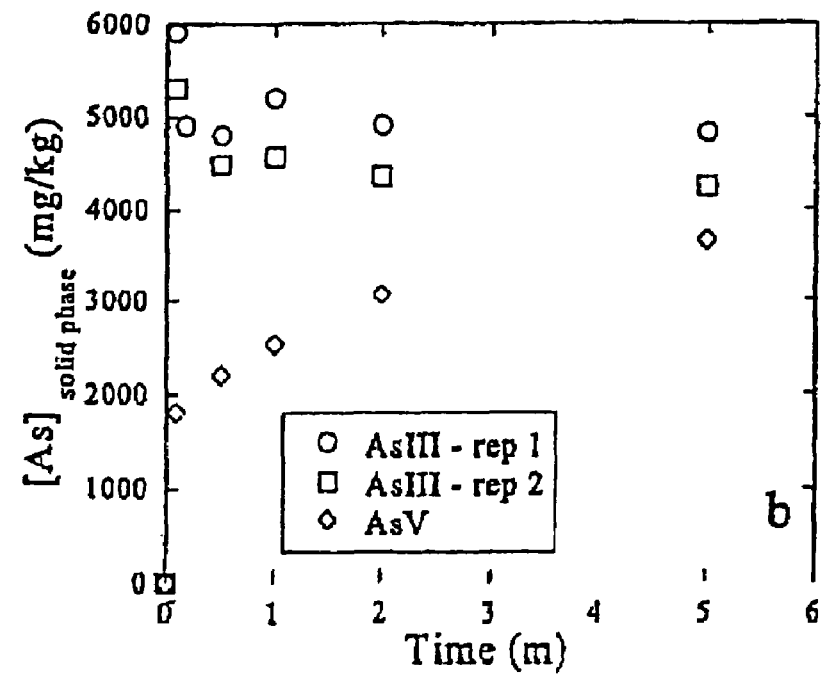

FIGS. 2a and 2b show sorption of total arsenic as a function of time. FIG. 2b expands the initial stages of the kinetics experiment. For initial species as As(III), both replicates showed an initial sorption spike followed by a slight release of arsenic back into solution, followed by a gradual uptake of arsenic. It is speculated that this may correspond to a catalytic reaction where As(III) is oxidized and released back into solution. There was no ruthenium detected in any of the solution aliquots taken for the kinetic experiments.

The data were processed by linearized versions of rate laws. The sorption reaction data for both initial species conform very well to second-order kinetics, and thus the rate is dependent on total concentration. The rate constants, k, of the different initial species present were as follows: kAs(V)= 0.02930 mol–1s–1, replicate 1 kAs(III)=0.00801 mol–1s1, and replicate kAs(III)=0.00438 mol–1s–1. these value corresponding to half-lives (r1/2) for these specific initial conditions of r1/2As(V)=3.2 hours, replicate a r1/2As(III)= 11.6 hours, and replicate 2 r1/2As(III)=21.14 hours. Although discrepancy exists in the replicates, possible due to slight sampling time differences in the early stages of the experiments, the k for As(V) is an order of magnitude greater than the k for As(III). These data, combined with results from the batch-sorption experiments, suggest that the early rate (within r1/2) of sorption for As(V) as the initial species is greater, but that the ultimate capacity for As sorption is greater when As(III) is present as the initial species.

X-ray Absorption Near-Edge spectroscopy (XANES)

All samples were prepared at 22 C (±2). A 2.0 gram sample of $RuO_2 \cdot xH_2O$ was equilibrated at pH 7 with 10 mL solutions of 500 mg/L As(V) or As(III) for periods of one month, two weeks, one week, and 24 hours. The samples were equilibrated until the pH remained at 7 for 24 hours (three days total). For the 24-hour sample (only oxic samples were examined for this time period), the required base was estimated from the other samples and was added along with the arsenic, and the mixture was equilibrated for 24 hours. The oxic samples were centrifuged and washed three times in background electrolyte, vacuum filtered through a 0.1 micron cellulose filter, covered, and left to dry in a desiccator.

The anoxic samples were purged with nitrogen and kept in a zero headspace container for the specified time period. Immediately prior to analysis, the anoxic samples were vacuum filtered in a nitrogen-purged glovebox and wasted with nitrogen-purged background electrolyte, and the resulting paste was transferred to Teflon sample holders for analysis.

Pure $NaAsO_3$ and $NaHAsO_4 \cdot 7H_2O$ solids were mixed indifferent proportions and diluted in a KBr matrix, resulting in a total arsenic concentration of 10,00 mg/kg. The different quantities (0-100%, 25-75%, 50-50%, etc.) allowed semi-quantitative analysis of the samples for percent ranges of As(III) and As(V). This semiquantitative approach was modeled after work by Schulze et al. on manganese oxidation states (Schulze et al., 1995).

Arsenic K-edge spectra (11,867 eV) were collected a beamline 5-BM (Dow-Northwestern-DuPont Collaborative access Team) at the Advanced Photon Source at Argonne National Laboratory, Argonne, Ill. XANES spectra were collected in both fluorescent and transmission mode with a solid-state detector. The electron storage ring operated at 7 GeV with the horizontal entrance slit set at 6 mm and the vertical at 2.3 mm. Scans ranged from 111,767 to 12,245 eV. Data were analyzed by WinXAS version 1.3 (Ressler, 1998). Individual spectra were background corrected using a two-polynomial fit, three spectra per sample were averaged, and the first derivative was calculated for each averaged spectra. The results for the samples were compared with those from the fabricated reference materials for assessment of solid-state speciation of arsenic.

FIG. 3 shows the results for the fabricated reference materials and selected samples. There was no evidence of the presence of As(III) on the solid phase for any of the combinations examined. For the longest time period in anoxic conditions, four weeks, there was no evidence of As(III) so, irrespective of the initial species, no reduction of arsenic occurred in this time frame. Data from the shortest exposure of As(III) to $RuO_2 \cdot xH_2O$ conclusively illustrated the association of As(V) alone with the solid state.

One possible explanation for the increase in sorption when As(III) is present as the initial phase is structural change. Over et al., 2000, clearly showed voids in the $RuO_2$ structure following evolution of $CO_2$, which was the oxidation product of CO. If a similar phenomenon occurs with the oxidation of As(III) to As(V), the addition of reactive binding sites due to voids from vacated oxygen atoms may be responsible for the higher ultimate capacity for binding the recently oxidized As(V).

$RuO_2 \cdot xH_2O$ can be used to make current remediation processes more effective in the oxidation, removal, and degradation of a wide variety of contaminants. Research is also underway on the production of engineered Fe—Ru mixed precipitates where ruthenium acts as an oxidizer and the iron oxide acts as the sorbing medium.

Figure 4:
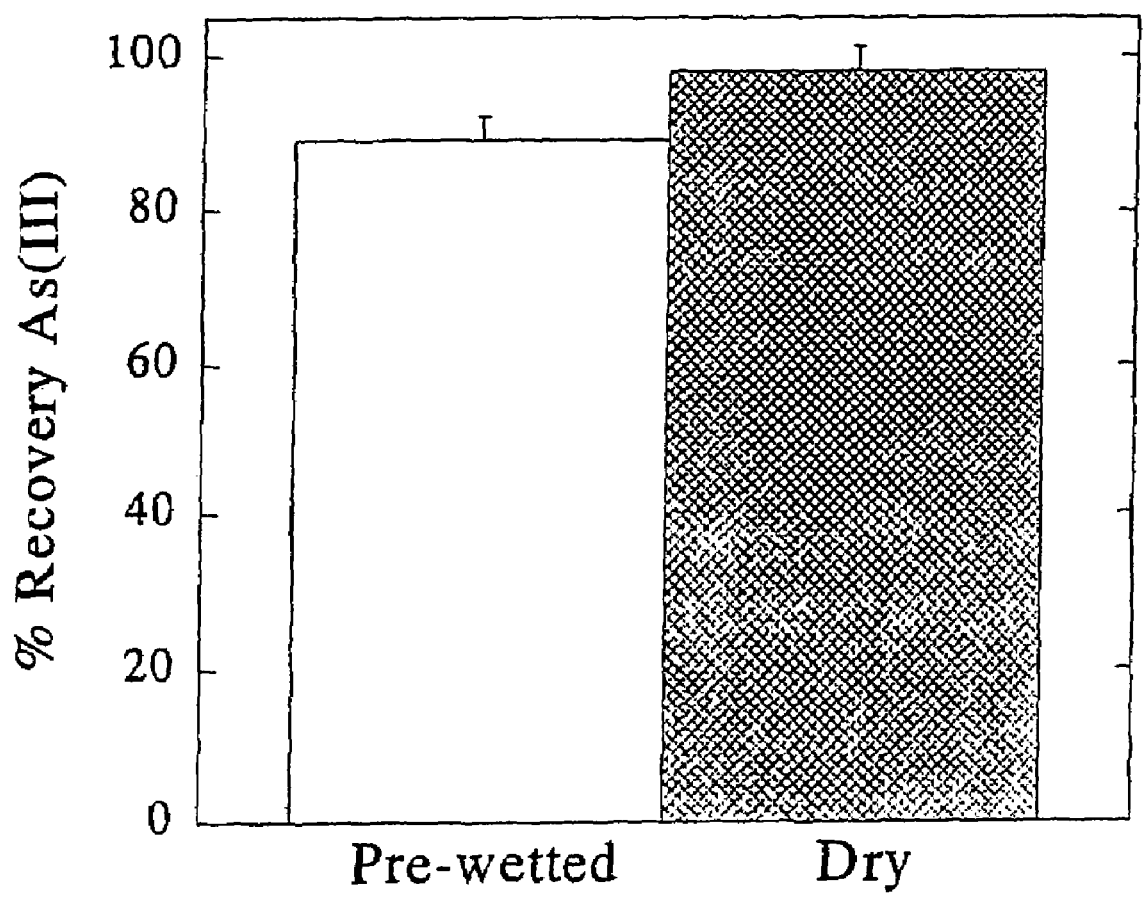
FIG. 4 shows sorption of arsenate and arsenite on $RuO_2 \cdot xH_2O$.

FIG. 4 shows recovery of As(III) after passing through QMA Sep-pak cartridge (n=5). Use of the cartridges without pre-wetting with 0.01 M $NaNO_3$ background electrolyte resulted in improved recoveries of As(III). Retention of As(II) leads to falsely positive results for As(V). Error bars represent standard deviation.

Figure 5:
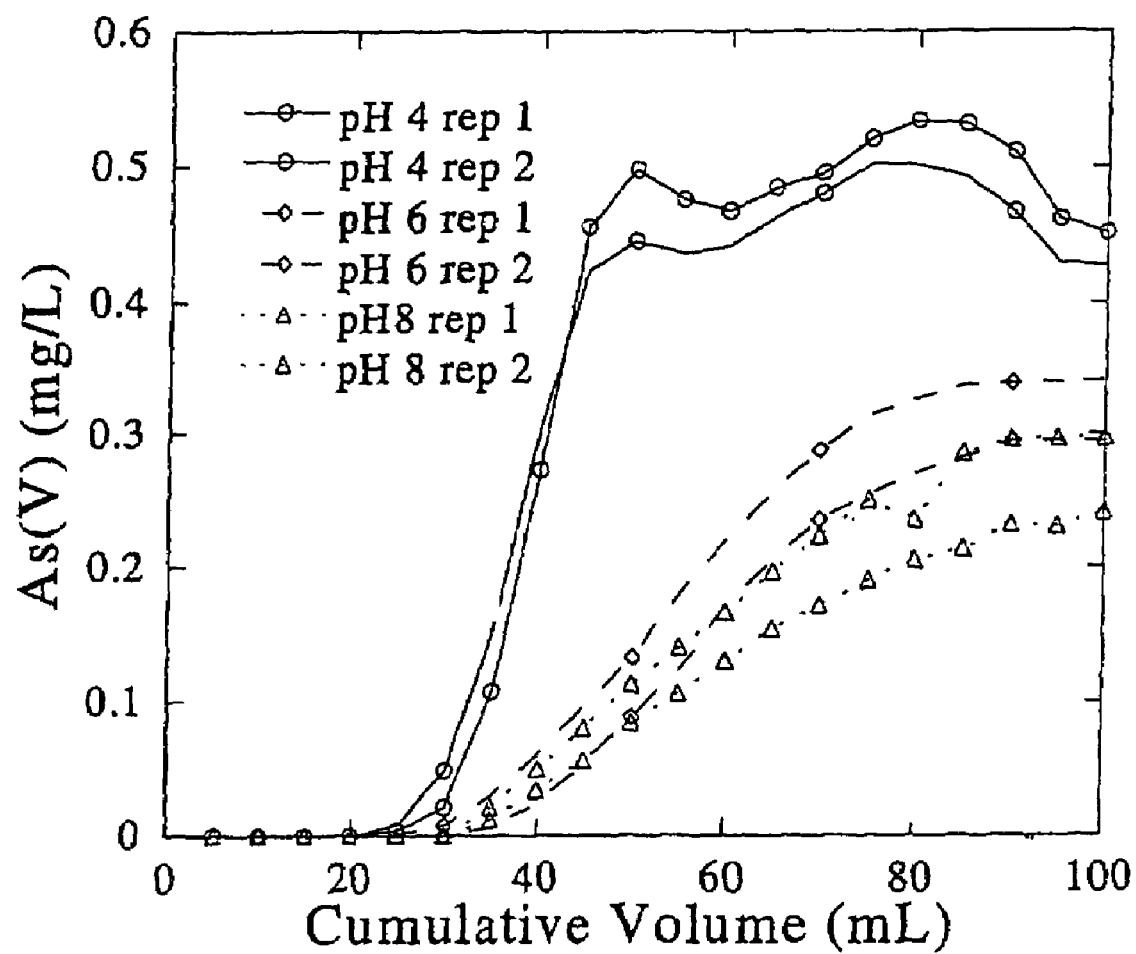
FIG. 5 shows cumulative volume of arsenic sorbed on $RuO_2 \cdot xH_2O$

FIG. 5 illustrates the breakthrough of As(V) on QMA Sep-pak cartridge in background electrolyte as a function of pH. The solution speciated was 0.3 mg/L and total volume was 100 mL. All solutions speciated in this study were diluted with background electrolyte. Based on these data, a 5 mL sample with a concentration of 1.2 mg/L total arsenic could be safely speciated by these cartridges. The flow rate used was 5 mL/minute, which roughly equates to 2 drops/second.

Figure 6A:
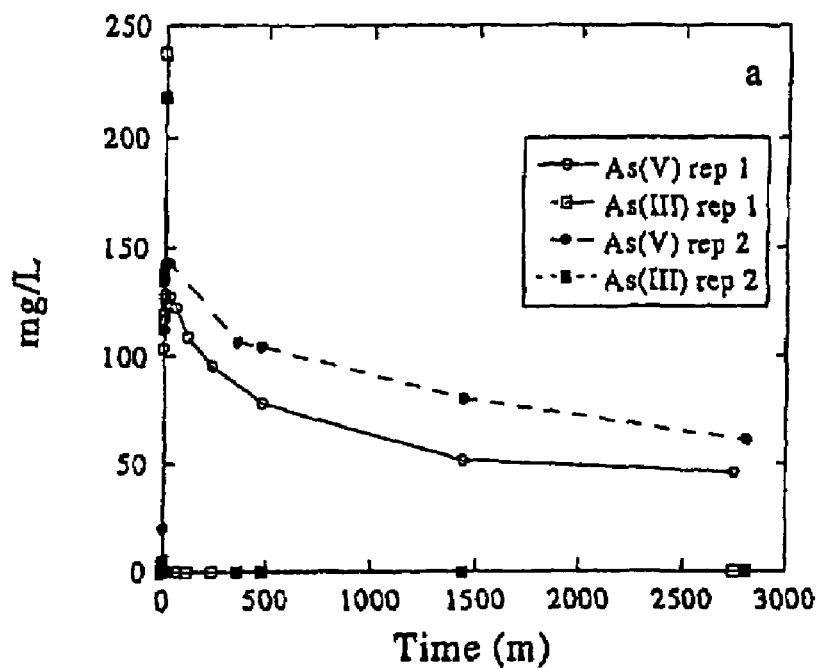
FIGS. 6a and b show the rapid oxidation of As(III) to As(V).
Figure 6B:
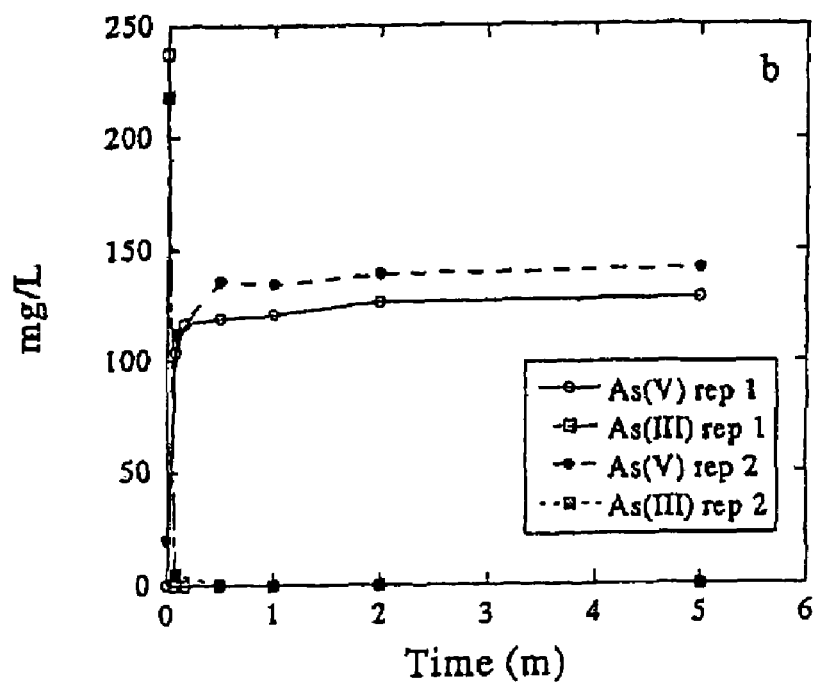

FIGS. 6a and 6n show arsenic speciation in the kinetic experiments showing the rapid oxidation of (III) to As(V). The data are for two replicates where As(III) was the initial species present.

Figure 7A:
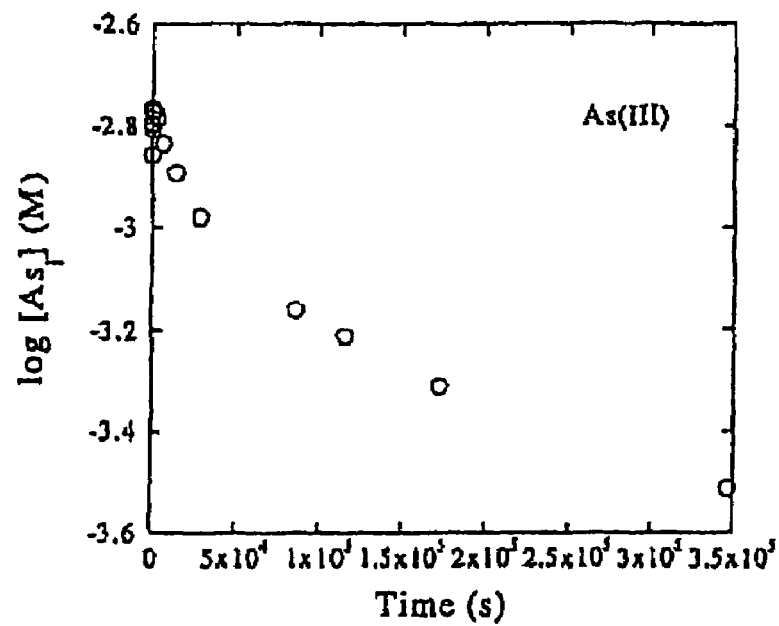
FIGS. 7a and 7b show data obtained for conformation to first order kinetics.
Figure 7B:
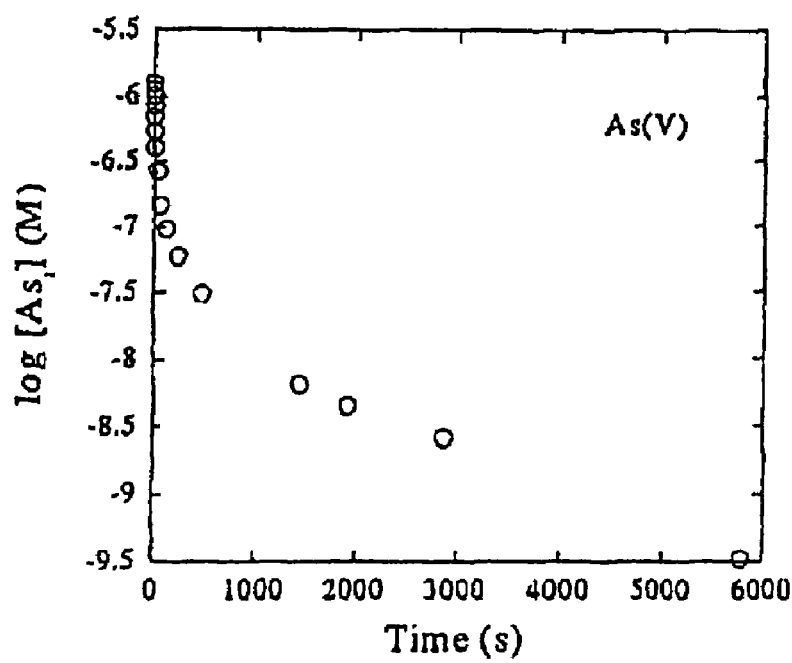
Figure 8:
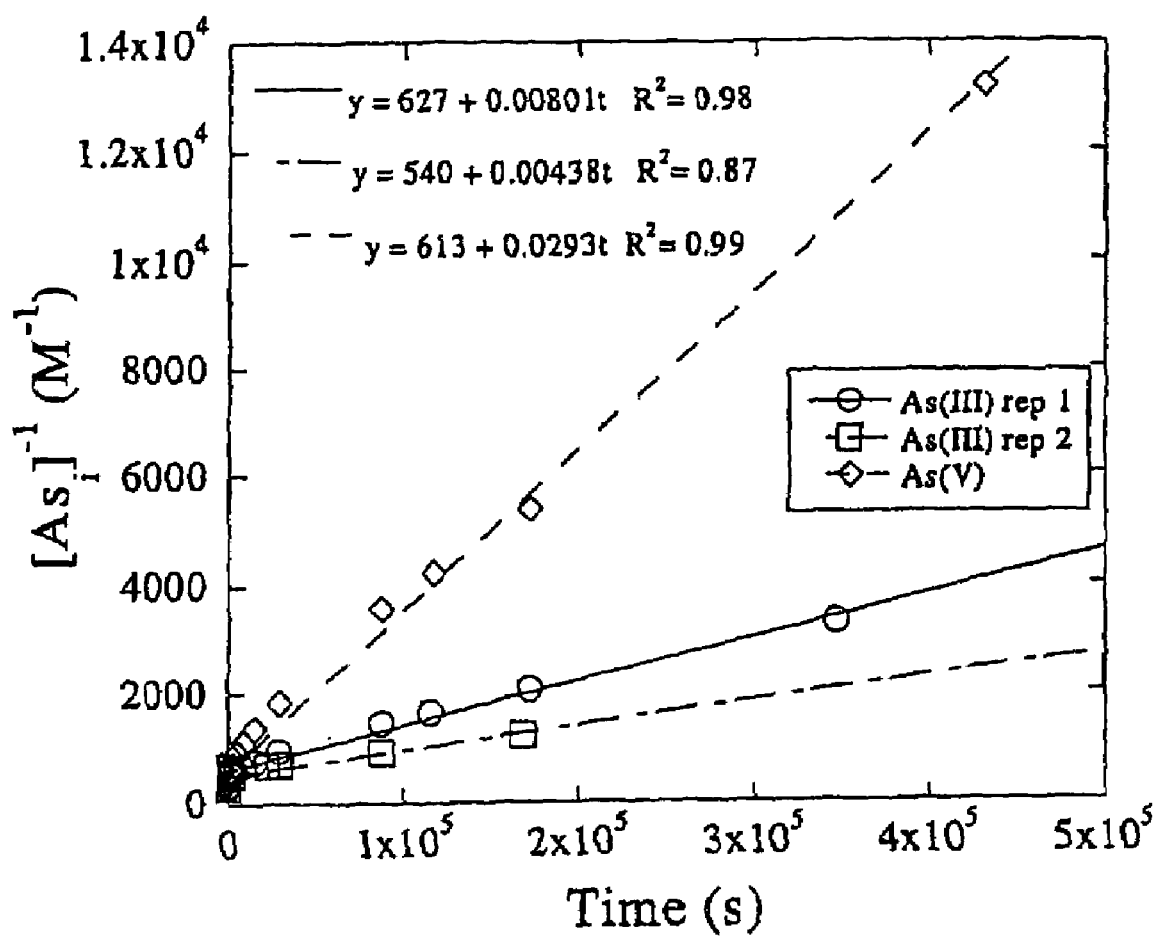
FIG. 8 is linearized second order plots for sorption of arsenic.
Figure 9A:
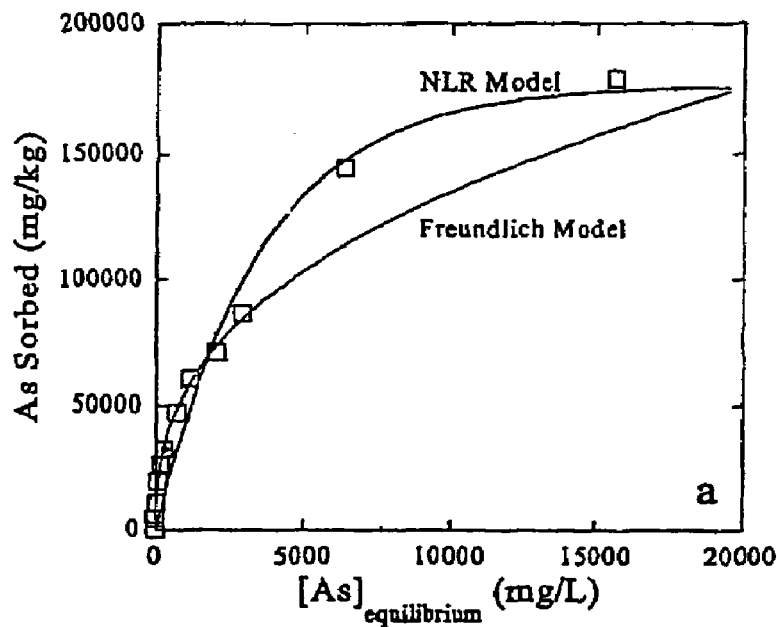
FIGS. 9a and 9b show constant solid:solution isotherms (CSI) for both initial arsenic species at pH 7.
Figure 9B:
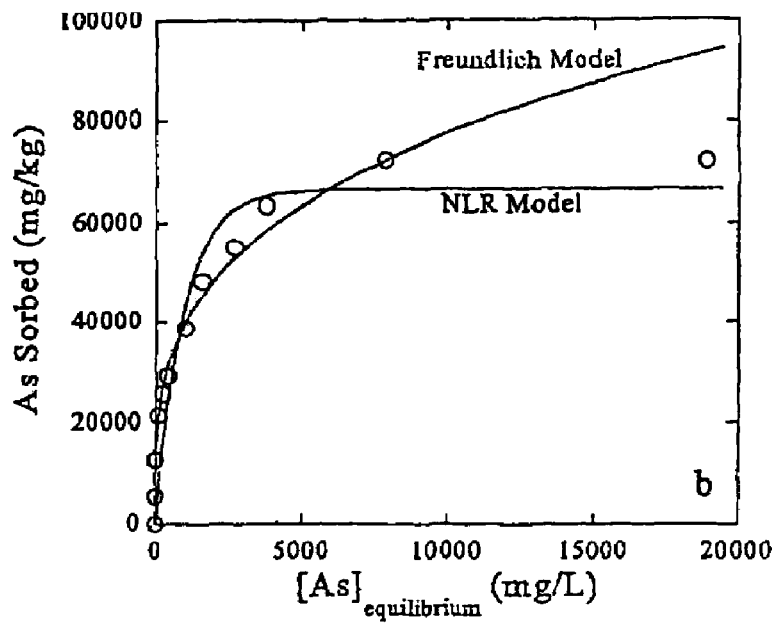
Figure 10A:
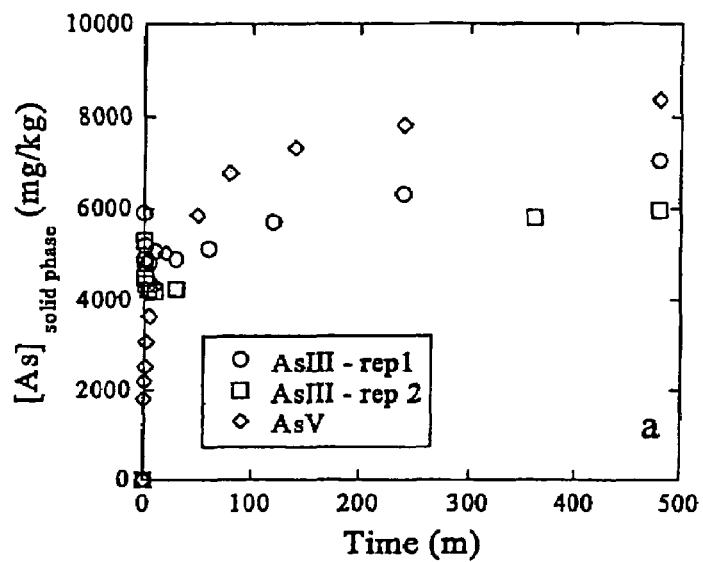
FIGS. 10a and 10b show kinetic data for total arsenic uptake (pH=7) from solutions with either As(III) or As(V) as the initial species.
Figure 10B:
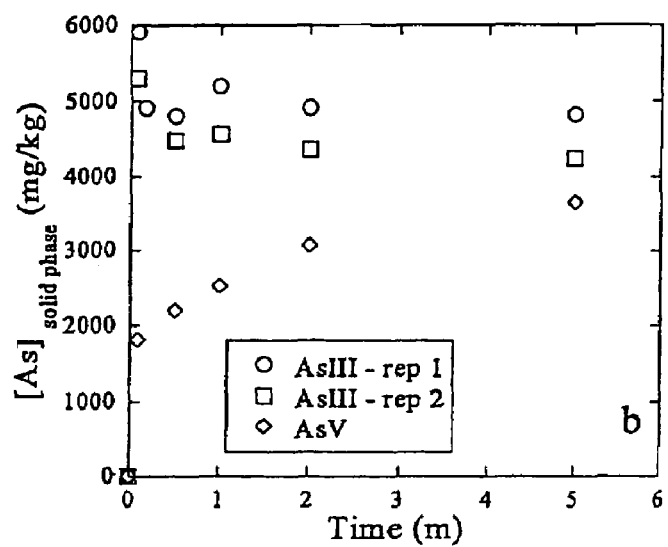

FIGS. 7a and 7b show linearized first order plots for sorption of arsenic. The curvature suggest non-conformation to first order kinetics.

In this case, the data were tested for conformation to first order kinetics by integration of the first order rate law:

$$D[As]/dt = -k1[As]$$

Where the differential equation represents the rate of arsenic loss from solution as a function of time, and k1 represents the reaction rate constant. The linearized version used in this study was:

$$\mathrm{Log}[As]t = \log[As]0 - (k1t/2.303).$$

Although the cost of raw ruthenium is high, the addition of small amounts of $RuO_2 \cdot xH_2O$ to water treatment media and soil/sediment reactive media may be highly cost-beneficial.

Ruthenium oxide and other ruthenium compounds can be used for treating industrial, municipal, or domestic wastewater, drinking water, surface water, and ground water. Treatment methods include conventional methods of coagulation/flocculation treatment operations.

The ruthenium compounds can also be used as solid media in filters and/or in cartridge based systems in which the contaminated solution flows through the treatment media. The ruthenium compounds can be used in combination with activated carbon, ion exchange media, ozone, ultraviolet light, sand filtration, reverse osmosis, other types of filtration including ultra or nano filtration, and other sorptive media, including clays, zeolites, and iron oxides.

In treating soils and sediments, the ruthenium materials can be applied to the surface or incorporated into sediments and soils for in situ immobilization of contaminants. Ruthenium materials can also be used in fixed, permeable reactive barriers for in situ treatment of soils, sediments, or groundwater systems. These materials can also be used in ex situ treatment of soils and sediments by contacting the excavated contaminated materials with the ruthenium compounds in containers and/or mixers.

The treatment of contaminants arises from physical contact of the contaminated media with the surface of the ruthenium compounds. For liquids to be treated, the contact time is on the order of seconds to minutes. For solids and sediments, the contact time is on the order of minutes to days for ex situ treatments and permeable reactive barriers. For in situ treatment in which the ruthenium compounds are applied and mixed, contact time can be on the order of minutes to days.

In treating a contaminated source, the ruthenium compounds are generally applied in amounts ranging from about 0.1% to about 100% ruthenium compound to contaminant, by weight, depending upon the type and concentration of contaminants to be treated.

In situations in which the ruthenium compounds can be physically separated, i.e., filter cartridges, sludges, PRBs, the compounds can be recharged by acid washing, water rinsing, and aeration with air or oxygen, and then reused.

The foregoing description of the specific embodiments will so fully reveal the general nature of the invention that others can, by applying current knowledge, readily modify and/or adapt for various application such specific embodiments without undue experimentation and without departing from the generic concept. Therefore, such adaptations and modifications should and are intended to be comprehended within the meaning and range of equivalents of the disclosed embodiments.

It is to be understood that the phraseology or terminology employed herein is for the purpose of description and not of limitation. The means and materials for carrying out various disclosed functions may take a variety of alternative forms without departing from the invention.

Thus, the expressions "means to . . . " and "means for . . . " as may be found in the specification above and/or in the claims below, followed by a functional statement, are intended to define and cover whatever structural, physical, chemical, or electrical element or structures which may now or in the future exist for carrying out the recited function, whether or nor precisely equivalent to the embodiment or embodiments disclosed in the specification above. It is intended that such expressions be given their broadest interpretation.

REFERENCES CITED (1) Karim, M. *Water Res.* 2000, 34, 304-310.
(2) Berg, M.; Tran, H. C. Nguyen, T. C.; Pham, H. V.; Schertenleib, R.; Giger, W. *Environ. Sci. Technol.* 2001, 35, 2621-2626.
(3) Lackovic, J. A.; Nikolaidis, N. P.; Dobbs, G. M. *Environ. Eng. Sci.* 2000, 17, 29-39.
(4) Farrell, J.; Wang, J.; O'Day, P.; Conklin, M. *Environ. Eng. Sci. Technol.* 2001, 35, 2026-2032.
(5) Su, C.; Puls, R. W. *Environ. Sci. Technol.* 2001, 35, 1487-1492.
(6) Melitas, N.; Wang, J.; Conklin, M.; O'Day, P.; Farrell, J. *Environ. Sci. Technol.* 2002, 36, 2074-2081.
(7) Su, C.; Puls, R. W.; *Environ. Sci. Technol.* 2001, 35, 4562-4568.
(8) Pierce, M. L.; Moore, C. B. *Environ. Sci. Technol.* 1980, 14, 214-216.
(9) Pierce, M. L.; Moore, C. B. *Water Res.* 1982, 16, 1247-1253.
(10) Sun, X.; Doner, H. E. *Soil Sci.* 1998, 163, 278-287.
(11) Manning, B. A.; Fendorf, S. E.; Goldberg, S. *Environ. Sci. Technol.* 1998, 32, 2383-2388.
(12) O'Reilly, S. E.; Strawn, D. G.; Sparks, D. L. *Soil Sci. Soc. Am. J.* 2001, 65, 67-77.
(13) Randall, S. R.; Sherman, D. M.; Ragnarsdottir, K. V. *Geochem. Cosmochim. Acta* 2001, 65, 1015-1023.
(14) Grafe, M.; Eick, M. J.; Grosslm P. R.; Saunders, A. M. *J. Environ. Qual.* 2002, 31, 1115-1123.
(15) Jain, A.; Raven, K. P.; Loeppert, R. H. *Environ. Sci. Technol.* 1999, 33, 1179-1184.
(16) Redman, A. D.; Macalady, D. L.; Ahmann, D. *Environ. Sci. Technol.* 2002, 36, 2889-2896.
(17) Manning, B. A.; Fendorf, S. E.; Bostick, B.; Suarez, D. L. *Environ. Sci. Technol.* 2002 36, 976-981.
(18). Tournassat, C.; Charlet, L.; Bosbach, D.; Manceau, A. *Environ. Sci. Technol.* 2002, 36, 493-500.
(19) Moore, J. N.; Walker, J. R.; Hayes, T. H. *Clays Clay Miner.* 1990, 38, 549-555.
(20) Driehaus, W.; Seith, R.; Jekel, M. *Water Res.* 1995, 29, 297-305.
(21) Scott, M. J.; Morgan, J. J. *Environ. Sci. Technol.* 1995, 29, 1898-1905.
(22) Orcarson, D. W.; Huang, P. M.; Liaw, W. K.; Hammer, U. T.; *Soil Sci. Soc. Am. J.* 1983, 47, 644-648.
(23) Anderson, M. A.; Ferguson, J. F.; Gavis, J. J. *Colloid Interface Sci.* 1975, 54, 391-399.
(24) Arai, Y.; Elzinga, E. J.; Sparks, D. L.; *J. Colloid Interface Sci.* 2001, 235, 80-88.
(25) Halter, W. E.; Pfeifer, H. R. *Appl. Geochem.* 2001, 16, 793-802.
(26) Mahuli, S.; Agnihotri, R.; Chauk, S.; Ghosh-Dastidar, A.; Fran, L. *Environ. Sci. Technol.* 1997, 31, 3226-3231.
(27) Bothe, J. V.; Brown, P. W. *Environ. Sci. Technol.* 1999, 33, 2806-3811.
(28) Greenwood, N. N.; Earnshaw, A. *Chemistry of the Elements,* 2nd ed.; Butterworth-Heinemann: Oxford, 1997.
(29) Ayres, D.C. In *Accidental Exposure to Dioxins. Human Health Aspects*; Coulston, F.; Pocchiari, D., Eds.; Ecotoxicological and Environmental Quality Series 5; Academic Press: New York, 1983.

(30) Yang, L. X.; Farr, J. P. G.; Ashworth, M. A.; Charnock, J. M. *Trans. Inst. Met. Finish.* 1999, 77, 226-229.
(31) McKeown, D. A.; Hagans, P. L.; Carette, L. P. L.; Russell, A. E.; Swider, K. E.; Rolison, D. R. *J. Phys. Chem. B* 1999, 103, 4825-4832.
(32) Over, H.; Kim, Y. D.; Seitsonen, A. P.; Wendt, S.; Lundgren, E.; Schmid, M.; Varga, P.; Morgante, A.; Ertl, G. *Science* 2000, 287, 1474-1476.
(33) Yalcin, S.; Le, X. C. *J. Environ. Monit.* 2001, 3, 81-85.
(34) Roy, W. R.; Krapac, I. G.; Chou, S. F. J.; Griffin, R. A. *Technical Resource Document Batch-type Procedures for Estimating Soil Adsorption of Chemicals*, U.S. EPA: Washington D.C., 1991; EPA/530/SW-87/006-F.
(35) Ihaka, R.; Gentleman, R. J. *Comput. Graph. Stat.* 1996, 5, 299-314.
(36) Schulze, D. G.; Sutton, S. R.; Bajt, S. *Soil Sci. Soc. Am. J.* 1995, 59, 1540-1548.
(37) Ressler, T. J. *Synchrotron Radiat.* 1998, 5, 118-122.
(38) Gupta, S. K.; Chen, K. Y. *J. Water Pollut. Control Fed.* 1978, 50, 493-506.
(39) Frost, R. R.; Griffin, R. A. *Soil Sci. Soc. Am. J.* 1976, 41, 53-57.
(40) Raven, K. P.; Jain, A.; Loeppert, R. H. *Environ. Sci. Technol.* 1998, 32, 344-349.
(41) Grafe, M.; Eick, M. J.; Grossl, P. R. *Soil Sci. Soc. Am. J.* 2001, 65, 1680-1687.
(42) Bernasconi, C. F. Relaxation Kinetics. Academic Press. NY. 1976
(43) Pohlmeirer, H. Personal Communication. 1999
(44) Sparks, D. L. *Kinetics of Soil Chemical Processes.* Academic Press, NY. 1989

What is claimed is:

1. A method for removing chemical and biological contaminants from water consisting of:
   a. contacting the water with an effective amount of at least one ruthenium compound selected from the group consisting of $RuO_2 \cdot xH_2O$ wherein x denotes the degree of hydration, Ru—Fe oxyhydroxides, Ru—Fe hydroxides, Ru—Fe oxides, Ru—Mn oxides, Ru—Mn oxyhydroxides, Ru—Mn hydroxides, Ru—Mn, Ru—Al oryhydroxides, Ru—Al hydroxide and Ru—Al oxides;
   b. whereby said chemical and biological contaminants are sorbed to said at least one ruthenium compound to form sorbed material; and
   c. removing the sorbed materiel from the water.

2. The method according to claim 1 wherein the ruthenium compound is $RuO_2 \cdot xH_2O$ where x denotes the degree of hydration.

3. The method according to claim 1 wherein the ruthenium compound is coated onto or complexed with at least one substance selected from the group consisting of sand, silica, zeolites, nylon, polystyrene, and cellulose.

4. The method according to claim 1 wherein the chemical and biological contaminants are selected from chemical compounds and biological substances which are positively or negatively charged in ionic form or which are charged compounds or substances.

5. The method according to claim 4 wherein the chemical and biological contaminants are selected from the group consisting of cationic-charged forms, salts, and complexes.

6. The method according to claim 5 wherein the cationic-charged forms, salts and complexes are selected from the group consisting of nitrate salts and sulfate salts of Ca, Cu, Cd, Ni, Rb, Zn, Cr, Co, Hg, U, Mn, and Mg.

7. The method according to claim 4 wherein the chemical and biological contaminants are selected from the group consisting of anions and anionic species.

8. The method according to claim 7 wherein the anions and anionic species are selected from the group consisting of perchlorate, chloride, bromide, arsenate, arsenite, phosphate, nitrate, sulfate and associated salts and compounds of the anions and anionic species.

9. The method according to claim 8 wherein the associated salts and compounds of the anions are selected from the group consisting of sodium arsenate and potassium bromide.

10. The method according to claim 4 wherein the chemical and biological contaminants are selected from the group consisting of charged and polar pesticides, fuels, pharmaceuticals, endocrine disruptors, and disinfection by-products.

11. The method according to claim 4 wherein the chemical and biological contaminants are selected from the group consisting of biological contaminants with charged surfaces.

12. The method according to claim 11 wherein the biological contaminants with charged surfaces are selected from the group consisting of bacteria, oocytes, and spores.

13. A method for remediating soil or sediment comprising contacting the soil or sediment with an effective amount of at least one ruthenium compound.

14. The method according to claim 13 wherein the ruthenium compound is selected from the group consisting of
   $RuO_2 \cdot xH_2O$ where x denotes the degree of hydration, Ru—Fe oxyhydroxides, Ru—Fe hydroxides, Ru—Fe oxides, Ru—Mn oxides, Ru—Mn oxyhydroxides, Ru—Mn hydroxides, Ru—Mn, Ru—Al oxyhydroxides, Ru—Al hydroxides, and Ru—Al oxides.

15. The method according to claim 14 wherein the ruthenium compound is $RuO_2 \cdot xH_2O$ where x denotes the degree of hydration.

16. The method according to claim 13 wherein the ruthenium compound is coated onto or complexed with at least one substance selected from the group consiscing of sand, silica, zeolites, nylon, polystyrene, and cellulose.

17. The method according to claim 13 wherein the chemical and biological contaminants are selected from chemical compounds and biological substances which are positively or negatively charged in ionic form or which are charged compounds or substances.

18. The method according to claim 17 wherein the chemical and biological contaminants are selected from the group consisting of cationic-charged forms, salts, and complexes.

19. The method according to claim 18 wherein the cationic-charged forms, salts and complexes are selected from the group consisting of nitrate salts and sulfate salts of Ca, Cu, Cd, Ni, Pb, Zn, Cr, Co, Hg, U, Mn, and Mg.

20. The method according to claim 17 wherein the chemical and biological contaminants are selected from the group consisting of anions and anionic species.

21. The method according to claim 20 wherein the anions and anionic species are selected from the group consisting of perchlorate, chloride, bromide, arsenate, arsenite, phosphate, nitrate, sulfate and associated salts and compounds of the anions and anionic species.

22. The method according to claim 21 wherein the associated salts and compounds of the anions are selected from the group consiscing of sodium arsenate and potassium bromide.

23. The method according to claim 17 wherein the chemical and biological contaminants are selected from the group consisting of charged and polar pesticides, fuels, pharmaceuticals, endocrine disruptors, and disinfection by-products.

24. The method according to claim 17 wherein the chemical and biological contaminants are selected from the group consisting of biological contaminants with charged surfaces.

25. A method for removing chemical and biological contaminants from water consisting of contacting the water with an effective amount of a combination of at least one ruthenium compound and at least one member selected from the group consisting of activated carbon, ion exchange media, ozone and ultraviolet light, and separating the chemical arid biological contaminants from the water by a method selected from the group consisting of flocculation, nano filtration, ultra filtration, sorption or sorptive media, sand filtration, and reverse osmosis.

* * * * *